(12) United States Patent
Trivedi et al.

(10) Patent No.: US 12,028,478 B2
(45) Date of Patent: Jul. 2, 2024

(54) SYSTEMS AND METHODS FOR PHISHING MONITORING

(71) Applicant: CAPITAL ONE SERVICES, LLC, McLean, VA (US)

(72) Inventors: Dwij Trivedi, Oakton, VA (US); Jennifer Lopez, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 70 days.

(21) Appl. No.: 17/650,868

(22) Filed: Feb. 14, 2022

(65) Prior Publication Data

US 2023/0262160 A1     Aug. 17, 2023

(51) Int. Cl.
| | |
|---|---|
| *G10L 15/22* | (2006.01) |
| *G06F 3/0481* | (2022.01) |
| *G10L 25/51* | (2013.01) |
| *G10L 25/72* | (2013.01) |
| *H04M 3/22* | (2006.01) |
| *H04M 3/42* | (2006.01) |
| *H04M 3/436* | (2006.01) |

(52) U.S. Cl.
CPC ........ *H04M 3/2281* (2013.01); *G06F 3/0481* (2013.01); *G10L 15/22* (2013.01); *G10L 25/51* (2013.01); *G10L 25/72* (2013.01); *H04M 3/2218* (2013.01); *H04M 3/42102* (2013.01); *H04M 3/42221* (2013.01); *H04M 3/4365* (2013.01); *H04M 2201/405* (2013.01)

(58) Field of Classification Search
CPC ............. H04M 3/2281; H04M 3/2218; H04M 3/42102; H04M 3/42221; H04M 3/4365; H04M 2201/405; G10L 15/22; G10L 25/51; G10L 25/72; G10L 17/26
USPC .......................................................... 704/251
See application file for complete search history.

(56) References Cited

U.S. PATENT DOCUMENTS

| | | | |
|---|---|---|---|
| 10,616,411 B1 * | 4/2020 | Chang ................. | H04M 3/2281 |
| 10,721,350 B1 * | 7/2020 | Maiorana ............ | H04M 3/2281 |
| 2002/0010587 A1 * | 1/2002 | Pertrushin ............... | G10L 17/26 |
| | | | 704/275 |
| 2003/0174823 A1 * | 9/2003 | Justice ................ | H04M 3/2281 |
| | | | 379/145 |
| 2011/0211682 A1 | 9/2011 | Singh et al. | |

(Continued)

*Primary Examiner* — Md S Elahee
(74) *Attorney, Agent, or Firm* — Bookoff McAndrews, PLLC

(57) ABSTRACT

Disclosed are methods and systems for voice phishing monitoring. For instance, a method includes receiving voice data of an incoming call to a communication device from an application associated with a user account and executing on the device, identifying an entity and interaction allegedly associated with the incoming call from the voice data, determining first fraud indicator data based on a number of the incoming call and second fraud indicator data based on a correspondence of user account interaction data to the entity and/or interaction, and providing the voice data to a trained machine learning system to receive third fraud indicator data based on content and/or a voice characteristic identified from the voice data. The method may further include determining a status for the incoming call of fraudulent or confirmed based on the first, second, and third fraud indicator data, and generating a notification indicating the status for display.

20 Claims, 10 Drawing Sheets

(56) References Cited

U.S. PATENT DOCUMENTS

| | | |
|---|---|---|
| 2018/0097841 A1 | 4/2018 | Stolarz et al. |
| 2020/0204677 A1* | 6/2020 | Kim .................. G10L 15/22 |
| 2021/0158360 A1 | 5/2021 | Somani et al. |
| 2021/0193174 A1 | 6/2021 | Enzinger et al. |

* cited by examiner

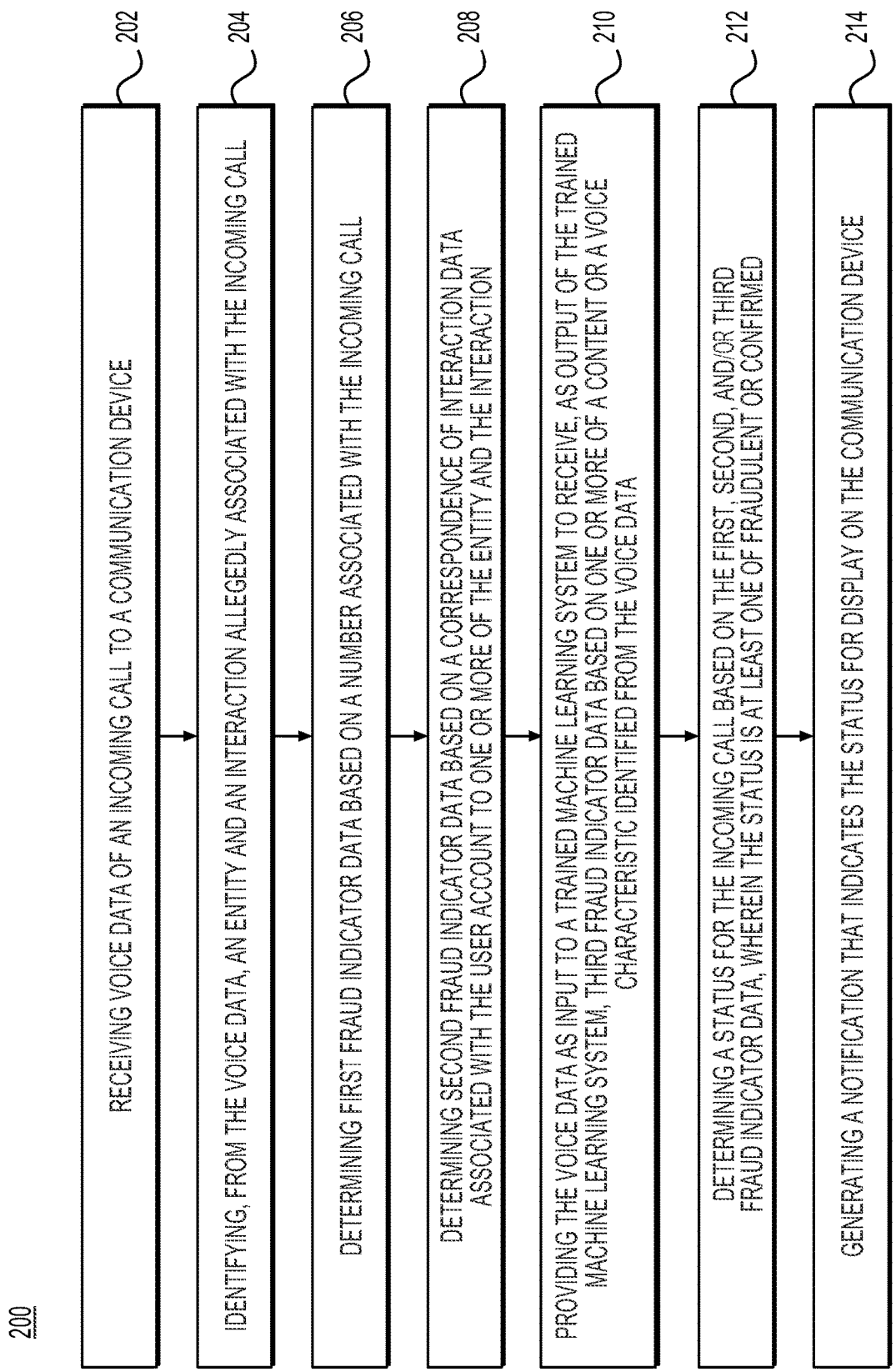

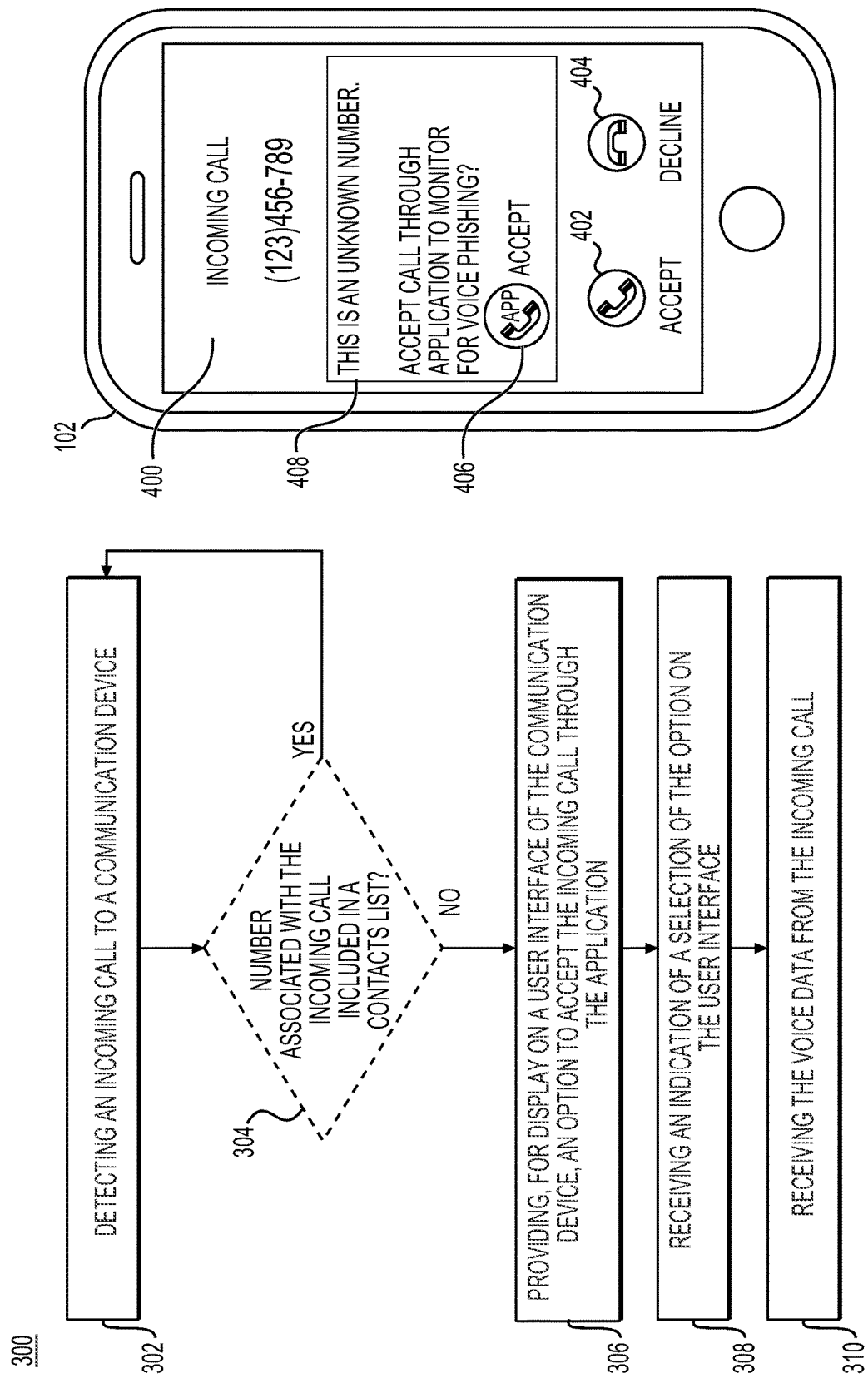

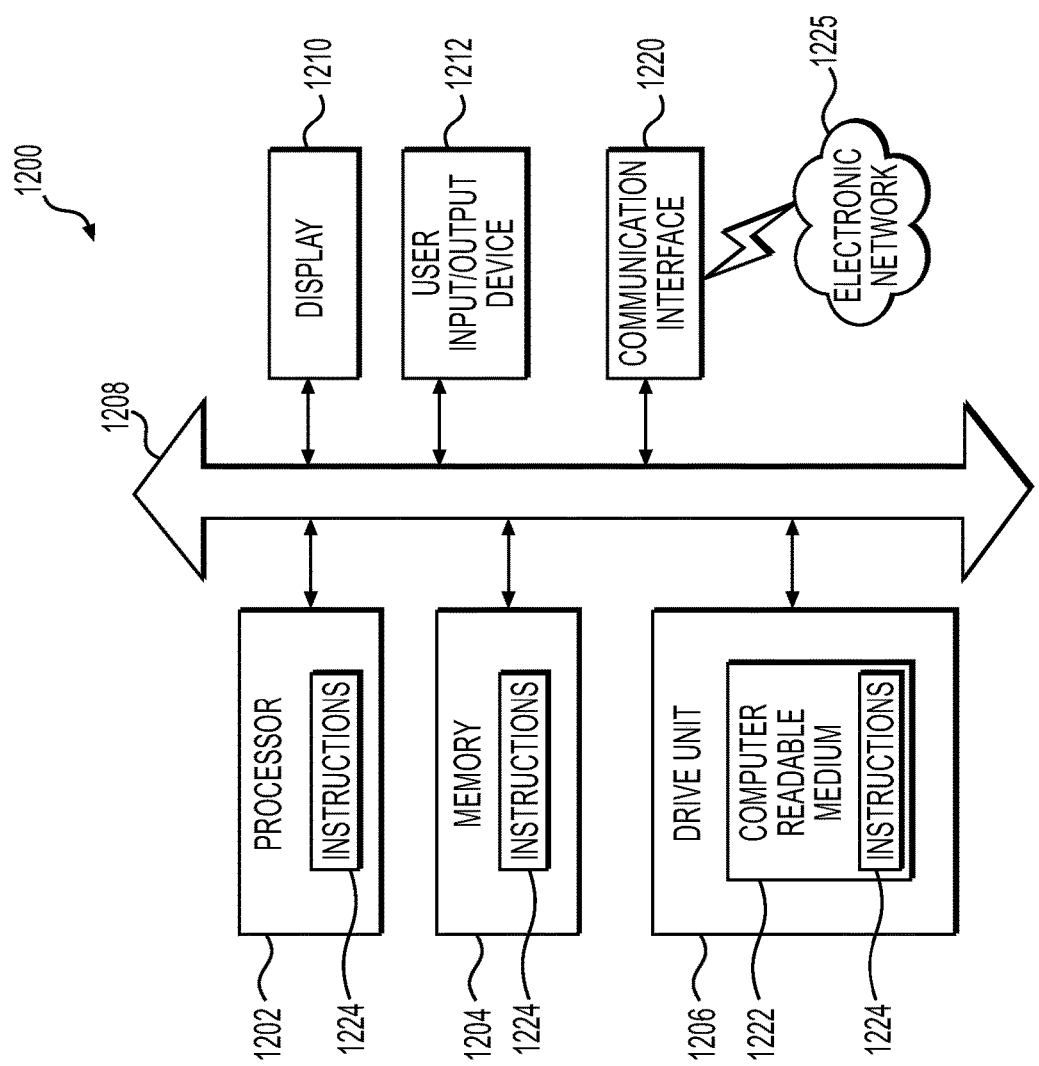

SYSTEMS AND METHODS FOR PHISHING MONITORING

TECHNICAL FIELD

Various embodiments of this disclosure relate generally to machine-learning-based techniques for phishing monitoring, and, more particularly, to systems and methods for determining a status of an incoming communication as at least one of fraudulent or confirmed, and generating a notification indicating the status.

BACKGROUND

Fraudsters attempt to capture sensitive data from individuals through a variety of channels using constantly evolving scams. One prominent example is voice phishing, or vishing, whereby fraudsters attempt to capture the sensitive data over a telephone call placed to the individuals. In a common voice phishing scenario, fraudsters pretend to be representatives from reputable entities in order to induce the individuals to reveal the sensitive data. Additionally, the fraudsters may use scare tactics that cause the individuals to momentarily panic and take immediate action to divulge the sensitive data. The sensitive data may include information regarding financial accounts, credit cards, and/or a personal identity of the individuals that when provided to the fraudsters may compromise the individual's online security, among other examples.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for voice phishing monitoring. The methods and systems may provide an ability to process data from an incoming call, including voice data, to determine a status for the incoming call as at least one of fraudulent or confirmed based on one or more of a plurality of fraud indicator data types, and generate a notification that indicates the status.

For instance, a computer-implemented method for voice phishing monitoring may include receiving, from an application associated with a user account that is executing on a communication device, voice data of an incoming call to the communication device, identifying, from the voice data, an entity and an interaction allegedly associated with the incoming call, determining first fraud indicator data based on a number associated with the incoming call, determining second fraud indicator data based on a correspondence of interaction data associated with the user account to one or more of the entity and the interaction, and providing the voice data as input to a trained machine learning system to receive, as output of the trained machine learning system, third fraud indicator data based on one or more of a content or a voice characteristic identified from the voice data. The computer-implemented method may further include determining a status for the incoming call based on the first, second, and third fraud indicator data, where the status is at least one of fraudulent or confirmed, and generating a notification that indicates the status for display on the communication device.

A system for voice phishing monitoring may include at least one memory storing instructions, and at least one processor operatively connected to the at least one memory and configured to execute the instructions to perform operations. The operations may include receiving, from an application associated with a user account executing on a communication device, voice data of an incoming call to the communication device, identifying, from the voice data, an entity and an interaction allegedly associated with the incoming call, determining first fraud indicator data based on a number associated with the incoming call, determining second fraud indicator data based on a correspondence of interaction data associated with the user account to one or more of the entity and the interaction, and providing the voice data as input to a trained machine learning system to receive, as output of the trained machine learning system, third fraud indicator data based on one or more of a content or a voice characteristic identified from the voice data. The operations may further include determining a status for the incoming call based on the first, second, and third fraud indicator data, where the status is at least one of fraudulent or confirmed, and generating a notification that indicates the status for display on the communication device.

A computer-implemented method for voice phishing monitoring may include receiving, from an application associated with a user account that is executing on a communication device, voice data of the incoming call to the communication device, where an option to accept the incoming call through the application may be provided for display on a user interface of the communication device in response to a determination that the number associated with the incoming call is not included within a contacts list associated with the communication device, and the voice data of the incoming call is received in response to a selection of the option on the user interface. The computer-implemented method may further include identifying, from the voice data, an entity and an interaction allegedly associated with the incoming call, determining first fraud indicator data based on a number associated with the incoming call, determining second fraud indicator data based on a correspondence of interaction data associated with the user account to one or more of the entity and the interaction, and providing the voice data as input to a trained machine learning system to receive, as output of the trained machine learning system, third fraud indicator data based on one or more of a content or a voice characteristic identified from the voice data. The computer-implemented method may further include determining a status for the incoming call based on the first, second, and third fraud indicator data, where the status is at least one of fraudulent or confirmed, and generating a notification that indicates the status for display on the communication device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of an exemplary process for voice phishing monitoring, according to certain embodiments.

FIG. 3 depicts a flowchart of an exemplary process for initiating receipt of voice data of an incoming call to enable voice phishing monitoring, according to certain embodiments.

FIG. 4 depicts an exemplary user interface of a communication device receiving an incoming call that includes an option to accept the incoming call through an application to enable voice phishing monitoring, according to certain embodiments.

FIG. 12 depicts an example of a computer, according to certain embodiments.

DETAILED DESCRIPTION OF EMBODIMENTS

Figure 1:
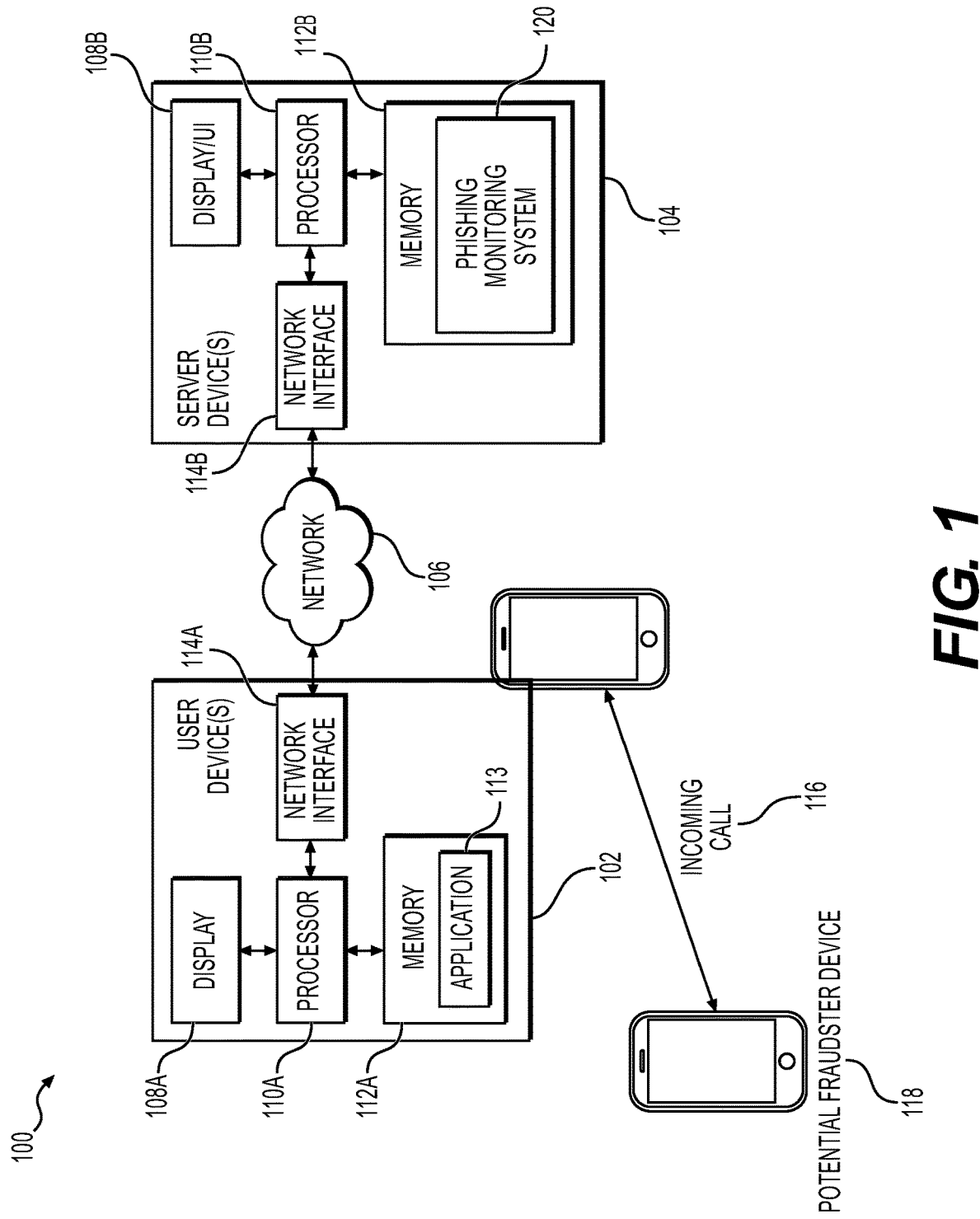
FIG. 1 depicts an exemplary environment for phishing monitoring, according to certain embodiments.

According to certain aspects of the disclosure, methods and systems are disclosed for phishing monitoring, including voice phishing monitoring. Instances of voice phishing, whereby fraudsters attempt to induce individuals to divulge sensitive data over telephone calls using deception and/or duress, are increasing at an alarming rate. The longer an individual remains on a call with the fraudster, the greater amount of sensitive data that may be captured. Voice phishing fraudsters often work off of scripts having content patterns and/or utilize patterned behaviors when placing calls, where the patterns may be constantly evolved by the fraudsters to evade detection and improve chances of successfully capturing the sensitive data. Accordingly, improvements in technology relating to real-time monitoring, detection, and/or mitigation of voice phishing are needed that account for the evolutionary nature of fraudster patterns.

As will be discussed in more detail below, in various embodiments, systems and methods are described for determining a status for an incoming call to a user's communication device as at least one of fraudulent or confirmed and generating a notification indicating the status for display on the communication device. The status determination and corresponding notification generation may occur in real-time or near-real time as data of the incoming call, including voice data, is received and processed by one or more trained machine learning systems and/or models. Accordingly, these system and methods may assist the user "in the moment" as they are participating in a conversation with a potential fraudster, which allows the user to take more immediate action, e.g., terminate the call as soon as possible, to prevent in its entirety, or at least lower the amount of, sensitive data divulged.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "individual" generally encompass any person or entity that may desire phishing monitoring services (e.g., provided by a provider), such as voice phishing monitoring services for incoming calls to their communication devices. The term "application" may be used interchangeably with other terms like "program," or the like, and generally encompasses software that is configured to interact with, modify, override, supplement, or operate in conjunction with other software.

As used herein, a "machine learning system" or "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning system or model is generally trained using training data, e.g., experiential data and/or samples of input data, which are fed into the system in order to establish, tune, or modify one or more aspects of the system, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning system may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

In an exemplary use case, certain embodiments may determine fraud indicator data of a plurality of types from data, including voice data, of an incoming call for determining a status of an incoming call as part of a process for voice phishing monitoring. For example, when a user's communication device receives the incoming call, voice data of the call (e.g., the conversation between the potential fraudster and the user) may be received via an application that has permissions to receive the call and is associated with a user account. Real-time processing of the voice data including content and voice characteristics identified therefrom, in addition to other data such as an associated phone number, interaction data associated with the user account, and/or context data, may yield fraud indicator data of a plurality of different types. Each type of fraud indicator data may be a useful data point for assessing a likelihood of the incoming call being fraudulent. A status of the incoming call as at least one of confirmed (e.g., non-fraudulent) or fraudulent may then be determined based on one or more of the plurality of fraud indicator data types (e.g., based on one or more of the data points).

One or more of the fraud indicator data types and/or status may be determined using one or more trained machine learning systems and/or or models. In certain embodiments, a machine learning system (e.g., a first machine learning system) may be trained to determine third fraud indicator data based on content and/or a voice characteristic identified from voice data of an incoming call. In another exemplary use case, the same first machine learning system or a different, second machine learning system may be trained to determine fourth fraud indicator data based on context data from the incoming call. In further exemplary use case, a model may be trained to determine a status of the incoming call based on one or more of a plurality of different fraud indicator data types (e.g., based on first, second, third, and/or fourth fraud indicator data). In some examples, this trained model is a machine learning model. The use of these trained machine learning systems and/or models (and the associated learning processes applied to build or train these systems and/or models) facilitate the systems' ability to detect fraudster patterns and adjust overtime to account for the evolution in fraudster patterns.

Once the status is determined, a notification indicating at least the determined status may be generated and provided to the user's communication device to notify the user in real-time or near real-time as to whether the incoming call is likely fraudulent. In scenarios where the status of the incoming call is determined to be fraudulent, the notification may also recommend call termination and/or provide controls elements that allow the user to take immediate action and terminate the call.

While the examples above involve determining a fraudulent or confirmed status of an incoming call to monitor for and protect users against voice phishing, it should be understood that techniques according to this disclosure may be adapted to other incoming communications, such as text messages, electronic messages, and/or the like to monitor for and protect users against other common types of phishing (e.g., smishing and email phishing). For example, for these other text-based communications, the plurality of fraud indicator data types may include fraud indicator data associated with a content, style and/or format of the text data, in addition to other fraud indicator data such as an associated phone number or electronic email address, interaction data associated with the user account, and/or context data of the communication. It should also be understood that the examples above are illustrative only. The techniques and technologies of this disclosure may be adapted to any suitable activity.

Presented below are various aspects of machine learning techniques that may be adapted for phishing monitoring (e.g., voice phishing monitoring). As will be discussed in more detail below, machine learning techniques adapted to phishing monitoring may include one or more aspects according to this disclosure, e.g., a particular selection of training data, a particular training process for the machine learning system, operation of the machine learning system in conjunction with particular data, modification of such particular data by the machine learning system, etc., and/or other aspects that may be apparent to one of ordinary skill in the art based on this disclosure.

FIG. 1 depicts an exemplary environment 100 for phishing monitoring, according to certain embodiments, and which may be used with the techniques presented herein. The environment 100 may include one or more user devices 102, one or more server devices 104, and one or more networks 106, collectively, networks 106. Although FIG. 1 depicts a single user device 102, server device 104, and network 106, the embodiments described herein are applicable to environments 100 that include two or more user devices 102, server devices 104, and/or networks 106 in any suitable arrangement.

The user device 102 may include a display 108A, a processor 110A, a memory 112A, and/or a network interface 114A. The user device 102 may be a mobile device, such as a cell phone (as illustrated), a tablet, a laptop computer, etc., a desktop computer, and/or the like. Additionally, the user device 102 may be a communication device capable of, among other things, receiving incoming telephone or voice calls placed by other communication devices, such as incoming call 116 from a potential fraudster device 118. The incoming call 116 may be received over a same or different network 106 over which the user device 102 communicates with the server device 104, as described elsewhere herein. The user device 102 may execute, by the processor 110A, one or more instructions stored in the memory 112A, where at least a portion of the instructions may be related to operations of an application 113 associated with an account of the user that is running on user device 102, as described elsewhere herein. In some examples, the application 113 may be a thick client application that is installed locally on the user device 102. In other examples, the application 113 may be a thin client application (e.g., a web application) that is rendered via a web browser launched on the user device 102. One or more components of the user device 102 may generate, or may cause to be generated, one or more graphic user interfaces (GUIs) based on instructions/information stored in the memory 112A, instructions/information received from the server device 104, and/or the like and may cause the GUIs to be displayed via the display 108A. The GUIs may be, e.g., mobile application interfaces or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display 108B, a processor 110б, a memory 112B, and/or a network interface 114B. The server device 104 may be a computer, system of computers (e.g., rack server(s)), or a cloud service computer system (e.g., in a data center). The server device 104 may be associated with a provider that provides, among other services, phishing monitoring services to user device 102. For example, in addition to the phishing monitoring services, the provider may provide user account services (e.g., may hold or otherwise provide the user account associated with the application 113). The server device 104 may execute, by the processor 110б, one or more instructions stored in the memory 112B to, e.g., monitor for phishing associated with incoming communications received at the user device 102, such as incoming call 116 received from the potential fraudster device 118. At least a portion of the instructions may be related to operations of a phishing monitoring system 120 that at least partially executes on the server device 104. The phishing monitoring system 120 may be implemented to monitor for one or more types of phishing, including voice phishing. One or more components of the server device 104 may generate, or may cause to be generated, one or more graphic user interfaces (GUIs) based on instructions/information stored in the memory 112B, instructions/information received from the application 113 executing on the user device 102, and/or the like and may cause the GUIs to be displayed via the display 108B.

The network 106 over which the user device 102 and server device 104 communicate may include one or more wired and/or wireless networks, such as the Internet, an intranet, a wide area network ("WAN"), a local area network ("LAN"), personal area network ("PAN"), a cellular network (e.g., a 3G network, a 4G network, a 5G network, etc.) or the like. The user device 102 and the server device 104 may be connected via the network 106, using one or more standard communication protocols. The user device 102 and the server device 104 may transmit and receive messages from each other (e.g., via application 113) across the network 106, as discussed in more detail below. The incoming call 116 may be received at the user device 102 from the potential fraudster device 118 over a same or different network 106 over which the user device 102 communicates with the server device 104.

As discussed in further detail below, one or more components of exemplary environment 100 may generate, store, train and/or use machine learning systems and/or models. The exemplary environment 100 or one of its components may include a machine learning system and/or instructions associated with the machine learning system, e.g., instructions for generating, training, and/or using the machine learning system, etc. The exemplary environment 100 or one of its components may include instructions for retrieving data, adjusting data, e.g., based on the output of the machine learning system(s), and/or operating a display to output data, e.g., as adjusted based on the machine learning system. The exemplary environment 100 or one of its components may include, provide, obtain, and/or generate training data.

For example, in one configuration, the server device 104 may store instructions for generating, training, and/or using the machine learning systems and/or models to perform the phishing monitoring. In this configuration, storage, memory, and computing resources of the user device 102 may be conserved, which improves the functionality of the user device 102. Additionally, based on a capability of the server device 104 to perform more resource intensive training and deployment operations than the user device 102, more complex machine learning systems and/or models for phishing monitoring may be generated. In another example configuration, the user device 102 may store such instructions as part of instructions for the application 113. In this configuration, latency of the application 113 is reduced as no communication back and forth from the server device 104 is needed and hardware acceleration on the user device 102 may be leveraged for faster processing. This may facilitate the real-time determination of the status of the incoming call and/or generation of the notification to alert the user. Additionally, by reducing the amount and frequency of data communications back and forth from the application 113 to the server device 104 over the network 106, network congestion maybe reduced, improving the performance of the network 106. Further, there may be greater privacy, as any sensitive information included within the voice data may not have to be provided over the network 106 to the server device 104, and phishing monitoring can be performed even when there is no network connectivity. In a further example configuration, the server device 104 and the user device 104 may each store at least a portion of the instructions or generating, training, and/or using the machine learning systems and/or models to perform the phishing monitoring.

In some embodiments, a system or device other than the components shown in the exemplary environment 100 may be used to generate and/or train the machine learning systems and/or models. For example, such a system may include instructions for generating and/or obtaining the machine learning systems, the training data, and/or instructions for training the machine learning systems. Resulting trained machine learning systems may then be provided to the exemplary environment 100 or one of its components and, for example, stored in the memory 112A and/or 112B.

Generally, a machine learning system or model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning system or model, unsupervised learning where, e.g., the sample of training data may not include pre-assigned labels or scores to aid the learning process or may utilize semi-supervised learning where a combination of training data with pre-assigned labels or scores and training data without pre-assigned labels or scores is used to train a machine learning model. Further embodiments may utilize, for training a machine learning system or model, reinforcement learning.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model. The training of the machine learning system and/or model may be configured to cause the machine learning system and/or model to learn associations between training data and ground truth data (e.g., if supervised learning) and/or learn patterns from the training data (e.g., if unsupervised learning), such that the trained machine-learning model is configured to determine an output in response to the input data based on the learned associations.

In various embodiments, the variables of a machine learning system and/or model may be interrelated in any suitable arrangement in order to generate the output. For example, in some embodiments, the machine learning system and/or model may include an architecture that is configured to determine fraud indicator data of varying types and/or a status of the incoming call as at least one of fraudulent or confirmed. For example, the machine learning system may include one or more neural networks configured to identify features in the data, and may include further architecture, e.g., a connected layer, neural network, etc., configured to determine a relationship between the identified features in order to determine the fraud indicator data of varying types and/or the status of the incoming call as at least one of fraudulent or confirmed, respectively.

Although depicted as separate components in FIG. 1, it should be understood that a component or portion of a component in the system of exemplary environment 100 may, in some embodiments, be integrated with or incorporated into one or more other components. For example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of the machine learning systems and models and/or how they may be trained or used for phishing (e.g., voice phishing) monitoring are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 depicts a flowchart of an exemplary process 200 for voice phishing monitoring, according to certain embodiments. In some examples the process 200 may be performed by the server device 104 (e.g., via the phishing monitoring system 120). At step 202, the process 200 may include receiving voice data of an incoming call to a communication device (e.g., user device 102). For example, the server device 104 may receive the voice data of the incoming call from the application 113 associated with the user account that is executing on the user device 102. The application 113 may be provided or hosted by a provider providing the user account. To provide a non-limiting example, the user account may be a financial account of the user that is provided or hosted by a financial institution holding the financial account. In some examples, in response to detecting the incoming call, the application 113 may perform one or more operations to enable the provision of the voice data to the server device 104, as described in detail elsewhere herein.

At step 204, the process 200 may include identifying an entity and an interaction allegedly associated with the incoming call from the voice data. In some examples, natural language processing or other similar techniques may be employed by the server device 104 (or another device or system) to convert the voice data from speech to text and identify the alleged entity and interaction from the text data. The alleged entity and interaction may be identified because fraudsters employing voice phishing often pretend to be representatives from reputable entities and use interaction-based scare tactics, such as overdue payment-related scare tactics, in order to induce individuals to divulge sensitive data. Therefore, the alleged entity and interaction may be used in further processing steps to evaluate the likelihood of the incoming call being a fraudulent call. As an illustrative example, a caller placing the incoming call to the user device 102 may state: "I am a representative from company A calling about an overdue payment." From this statement captured within the voice data, an alleged entity of "Company A" and an alleged interaction of "payment" or "overdue payment" may be identified.

At step 206, the process 200 may include determining first fraud indicator data based on a number associated with the incoming call. The first fraud indicator data may classify the number associated with the incoming call as a known fraudulent number, a verified number of the entity, or an unknown number (if not a known fraudulent number and not a verified number of the entity). For example, server device 104 may query one or more data sets stored internally or externally to server device 104 using the number to determine if there is any known affiliation of the number to fraudulent activity and/or to the alleged entity that may be indicative of a likelihood of the incoming call being fraudulent, where the first fraud indicator data may be in the form of one or more labeled affiliation data points for the determined affiliations, as described elsewhere herein.

At step 208, the process 200 may include determining second fraud indicator data based on a correspondence of interaction data associated with the user account to one or more of the entity and the interaction. The second fraud indicator data may include one or more labeled interaction data correspondence data points, where the labels are based on whether there is a correspondence between the interaction data and/or the entity, as described elsewhere herein. In some examples, the interaction data may be managed and stored by another system or device associated with the provider that is accessible by the server device 104. For example, the server device 104 may receive or obtain the interaction data from the other system or device, detect one or more patterns from the interaction data, and determine whether at least one pattern is associated with the entity and/or the interaction to yield the second fraud indicator data, as described elsewhere herein. Continuing the above illustrative example, where the caller placing the incoming call to the user device 102 states: "I am a representative from company A calling about an overdue payment," a determination is made as to whether the interaction data associated with the account includes past interactions corresponding to the alleged integration (e.g., past payments similar to the alleged overdue payment) and/or the alleged entity, "Company A".

At step 210, the process 200 may include providing the voice data as input to a trained machine learning system to receive, as output of the trained machine learning system, third fraud indicator data based on one or more of a content or a voice characteristic identified from the voice data. As previously discussed, the server device 104 may perform natural language processing or other similar techniques to convert the voice data from speech to text and provide the text data as input to the trained machine learning system. In some examples, the trained machine learning system may process the text data (e.g., representing content of the voice data) to identify words and/or phrases that correspond to known patterns used by fraudsters when engaging in voice phishing. Additionally, or alternatively, the server device 104 may process the voice data to identify one or more voice characteristics that may be associated with (e.g., characteristics that are impacted or changed) during fraudulent utterances, such as tone (e.g., voice quality), pitch, tempo, intensity (e.g., loudness), and/or the like. For example, in comparison to non-fraudulent utterances, fraudulent utterances may have a lower tone, higher pitch, faster tempo, or higher intensity.

Based on the processing of the text and/or voice data, the trained machine learning system may output a first value indicating a likelihood of the incoming call being fraudulent based on the identified content, a second value indicating a likelihood of the incoming call being fraudulent based on the identified voice characteristics, and/or a combined value based on the first and second values, described elsewhere herein. The values may be a probability or percentage, for example. In some examples, the third fraud indicator data may include the one or more values as one or more voice content and/or voice characteristics data points. In other examples, the third fraud indicator data may include one or more labeled voice content and/or voice characteristics data points of "true" or "false" based on the one or more values. For example, the one or more values may be compared to a predefined threshold value, where if a value meets or exceeds the predefined threshold value, a "true" label indicative of fraud is assigned to the respective data point.

At step 212, the process 200 may include determining a status for the incoming call based on one or more of the first, second, and/or third fraud indicator data, wherein the status is at least one of fraudulent or confirmed. For example, the server device 104 may provide the first fraud indicator data determined based on the number of the incoming call at step 206, the second fraud indicator data determined based on the correspondence of the user account interaction data and the entity and/or interaction at step 208, and/or the third fraud indicator data based on the content and/or voice characteristic identified from the voice data received as output from the trained machine learning system at step 210 to a model for processing to determine the status, as described elsewhere herein. In some examples, each of the first, second, and third fraud indicator data may be used in the status determination. In other examples, only one or two of the first, second, and third fraud indicator data may be used in the status determination. Optionally, fourth indicator data associated with a context of the incoming call (e.g., a context-related data point) may further be determined and provided to the model to be processed along with the first, second, and/or third fraud indicator data to determine the status for the incoming call, as described elsewhere herein. The first, second, third, and/or fourth fraud indicator data may include one or more respective data points that are useful in assessing likelihood of fraud, where, in some examples, the data points may be scaled or weighted based on their given contribution to the likelihood of fraud. Resultantly, the determined status may be based on a variety of different types of fraud indicator data to increase an accuracy of the determination, (e.g., to provide greater accuracy than if any one of the types of fraud indicator data had been used to make the determination alone). In some examples, an intermediate status (e.g., an unknown or undetermined status) may be determined as an additional alternative to a confirmed or fraudulent status.

At step 214, the process 200 may include generating a notification that indicates the status for display on the communication device (e.g., user device 102). For example, the notification may include text, images, animated graphics and/or the like that indicate the status of the incoming call (e.g., fraudulent, confirmed, unknown or undetermined). The notification may be provided over the network 106 to the user device 102 for display. In some examples, the notification may be provided as a push notification through the application 113 for display. In other examples, the notification may be provided as a text message to the user device 102.

In some examples, the notification may also include information that prompts a user to verify one or more of the entity or the interaction during the incoming call (e.g., particularly if the status is fraudulent or an unknown or undetermined status). Alternatively, the prompts may be provided in the form of tips for future incoming calls to provide education to the user. Additionally, or alternatively, the notification may include one or more control elements (e.g., buttons, check boxes, radio buttons, etc.) for causing the application 113 to perform an action, and information describing the control elements and/or requesting that the user make a selection of one or more of the control elements. For example, the notification may include a control element that, upon selection, causes the application 113 to terminate the incoming call 116 at the user device 102 (e.g., particularly when the present incoming call is determined to be fraudulent). Exemplary notifications are described elsewhere herein.

Accordingly, certain embodiments may perform voice phishing monitoring. The process 200 described above is provided merely as an example, and may include additional, fewer, different, or differently arranged steps than depicted in FIG. 2. Additionally, although the process 200 described above is performed by the server device 104, in other examples, the application 113 may perform at least a portion of or, alternatively, all of the process 200 locally on the user device 102.

FIG. 3 depicts a flowchart of an exemplary process 300 for initiating receipt of voice data of an incoming call to enable voice phishing monitoring, according to certain embodiments. In some examples, process 300 may be performed by the application 113 executing on user device 102. The process 300 may be performed prior to the server device 104 receiving voice data of the incoming call 116 from the application 113 at step 202 of process 200.

At step 302, the process 300 may include detecting an incoming call to a communication device. For example, application 113 may detect the incoming call 116 received at the user device 102 from the potential fraudster device 118. In some examples, the user may have previously opted in or otherwise provided permission for the application 113 to monitor for and/or detect incoming calls (e.g., through application settings selected via the application 113 running on user device 102).

At optional step 304, the process 300 may include a decision or determination as to whether the number associated with the incoming call is included in a contacts list associated with the communication device. For example, the application 113 may access the contacts list of user device 102, and query the contacts list using the number associated with the incoming call 116 determine whether the number is included in the contacts list. In some examples, the user may have previously opted in or otherwise provided permission for the application 113 to access the contacts list for the user device 102. If the number is determined to be included in the contacts list, and is thus a known number to the user that has a lower risk of being a fraudulent call, the process 200 may return to step 302, where a next incoming call is detected. If the number is determined to not be included in the contacts list, and is thus a potentially unknown number to the user with a higher risk of being a fraudulent call, then the process 300 may proceed to step 306. Alternatively, if optional step 304 is not performed, the process 300 may immediately proceed from step 302 to step 306.

At step 306, the process 300 may include providing an option to accept the incoming call 116 through the application 113 for display on a user interface of the communication device (e.g., user device 102). FIG. 4 depicts an exemplary user interface 400 of a communication device receiving an incoming call (e.g., user device 102 receiving incoming call 116) that includes an option 406 to accept the incoming call 116 through the application 113 to enable voice phishing monitoring. For example, the user interface 400 may include an incoming call screen for the user device 102 with accept and decline control elements 402, 404 to accept or decline the incoming call to the user device 102, respectively. The option 406 may be a control element included within a notification 408 that is overlaid on the incoming call screen, as illustrated. The notification 408 may include text, images, animated graphics and/or the like that describe the option 406 to accept the incoming call through the application 113 and/or request that the user make a selection of the option 406. If optional step 304 of process 300 is performed (e.g., determining whether the number associated with the incoming call is included in the contacts list), the notification may also include an indication that the number associated with the incoming call is an unknown number.

Returning to FIG. 3, at step 308, the process 300 may include receiving an indication of a selection of the option on the user interface. For example, if a user selects the option 406 on the user interface 400 displayed on user device 102, the application 113 may receive an indication of the selection. Such selection may serve as the user's authorization of the application 113 to receive and monitor voice data of the incoming call (e.g., the selection creates a permission). Therefore, at step 310, the process 300 may include receiving the voice data of the incoming call 116. Upon receiving the voice data of the incoming call 116, the application 113 may provide the voice data to the server device 104 over network 106 to enable the server device 104 to perform the process 200 for voice phishing monitoring. In other examples, the application 113 may perform the process 200 for voice phishing monitoring locally on the user device 102 using the voice data.

In additional examples, a display may be overlaid on the incoming call screen throughout the duration of the incoming call 116 that indicates the incoming call 116 is being received and monitored by the application 113. The display may also include a control element for revoking the permission to the application 113 (e.g., a revocation control element) to monitor the voice data of the incoming call 116. When the revocation control element is selected, the voice data may still be received through the application 113 (e.g., to prevent the incoming call from terminating); however, the application 113 may no longer be collecting and/or monitoring that voice data. Therefore, the application 113 may cease provision of the voice data to server device 104 for voice phishing monitoring.

Accordingly, certain embodiments may initiate receipt of voice data of an incoming call to perform voice phishing monitoring. The process 300 described above is provided merely as an example, and may include additional, fewer, different, or differently arranged steps than depicted in FIG. 3.

Figures 5A, 5B:
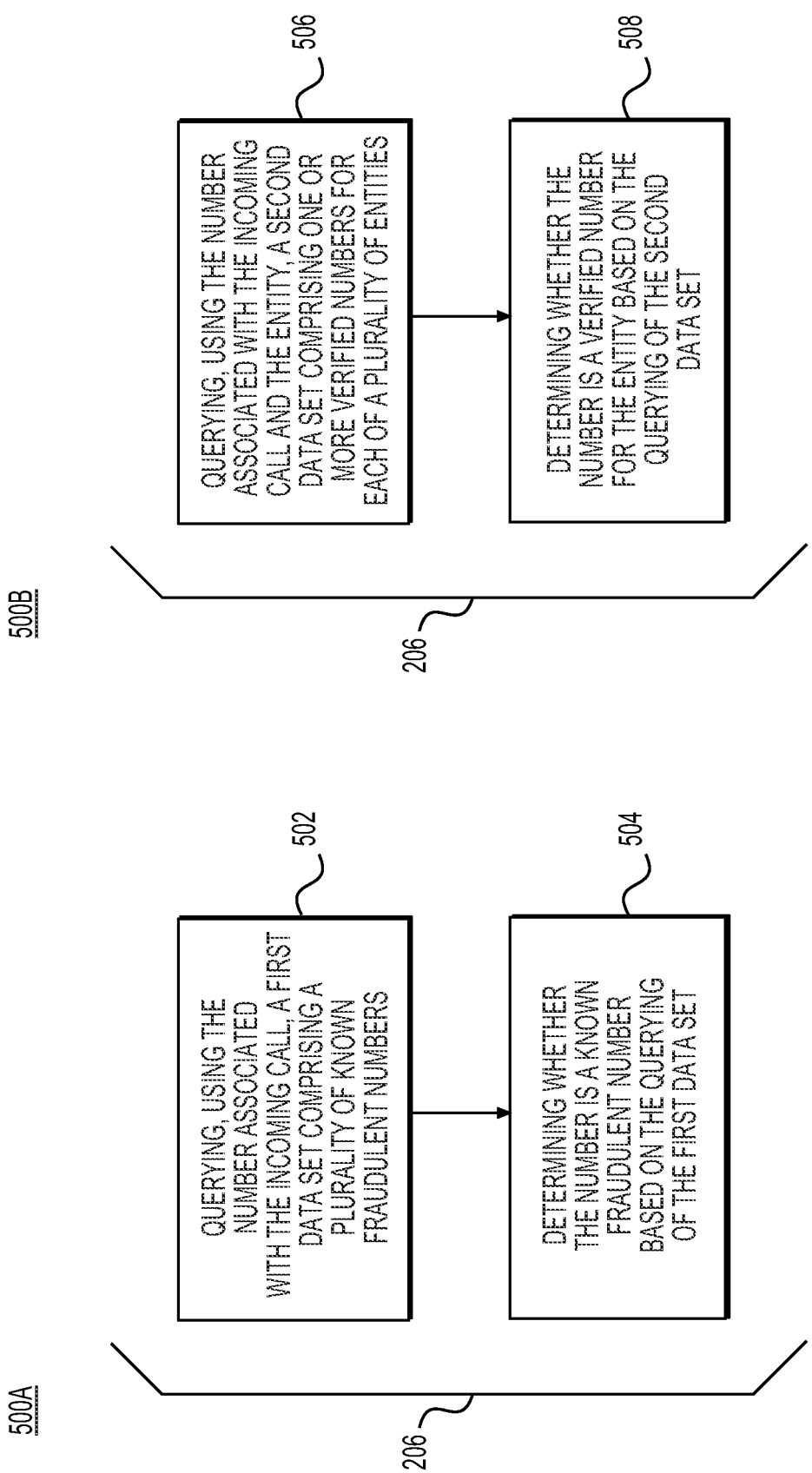
FIG. 5A depicts a flowchart of an exemplary process for determining first fraud indicator data, according to certain embodiments.
FIG. 5B depicts a flowchart of another exemplary process for determining first fraud indicator data, according to certain embodiments.

FIG. 5A depicts a flowchart of an exemplary process 500A for determining first fraud indicator data, according to certain embodiments. In some examples the process 500A may be performed by the server device 104 (e.g., via the phishing monitoring system 120 operating thereon). Process 500A may be used to perform at least a portion of step 206 of process 200 to determine first fraud indicator data based on a number associated with the incoming call 116. Particularly, server device 104 may perform process 500A to determine if there is any known affiliation of the number to fraudulent activity to yield at least a first affiliation data point for a known fraudulent number (e.g., a labeled known fraudulent number data point) used to classify the number.

To do so, at step 502 of process 500A, a first data set comprising a plurality of known fraudulent numbers may be queried using the number associated with the call. For example, the first data set may be a data set stored internally or externally to the server device 104 that is accessible by the server device 104. Given that fraudsters are constantly using new or different phone numbers for voice phishing attacks, the known fraudulent numbers included within the first data set may be pooled and/or periodically updated from one or more internal or external resources.

At step 504, the process 500A may determine whether the number is a known fraudulent number based on the querying of the first data set. The known fraudulent number data point may then be labeled based on the determination for inclusion within the first fraud indicator data. For example, if the number associated with the incoming call 116 is determined to be a known fraudulent number, the first fraud indicator data may include a label "true" for the known fraudulent number data point. If the number associated with the incoming call 116 is determined to not be a known fraudulent number, the first fraud indicator data may include a label "false" for the known fraudulent number data point.

FIG. 5B depicts a flowchart of another exemplary process 500B for determining first fraud indicator data, according to certain embodiments. In some examples the process 500B may be performed by the server device 104 (e.g., via the phishing monitoring system 120 operating thereon). Process 500B may be used to perform at least a portion of step 206 of process 200 to determine first fraud indicator data based on a number associated with the incoming call 116. Particularly, server device 104 may perform process 500B to determine if there is any known affiliation of the number to the alleged entity that may be indicative of a likelihood of the incoming call being fraudulent to yield at least a second affiliation data point for verified entity number (e.g., a labeled verified entity number data point) used to classify the number.

To do so, at step 506 of process 500B, a second data set comprising one or more verified numbers for each of the plurality of entities may be queried using the number associated with the call. As one illustrative example, the second data set may be a merchant information database that includes a variety of merchants and numbers that have been verified as being affiliated with the merchant. The second data set may be a data set stored internally or externally to the server device 104 that is accessible by the server device 104. As new numbers for existing merchants in the second data set or new merchants are verified, the second data set may be updated. Similarly, as existing numbers and/or merchants are determined to no longer be valid (e.g., the number is no longer in service and/or the merchant has gone out of business), the second data set may be updated accordingly.

At step 508, the process 500B may include determining whether the number is a verified number for the entity based on the querying of the second data set. The verified entity number data point may then be labeled based on the determination for inclusion within the first fraud indicator data. For example, if the alleged entity is included in the plurality of entities within the second data set and the number associated with the incoming call 116 is determined to be a verified number of the alleged entity, the first fraud indicator data may include a label "true" for the verified entity number data point. If the alleged entity is included in the plurality of entities within the second data set and the number associated with the incoming call 116 is determined to not be a verified number of the alleged entity, the first fraud indicator data may include a label "false" for the verified entity number data point. Alternatively, if the alleged entity is not included in the plurality of entities within the second data set, the first fraud indicator data may include a label "false" or "null" for the verified entity number data point.

In some examples, both processes 500A and 500B may be used to perform at least a portion of step 206 of process 200 to determine the first fraud indicator data. In such examples, the first fraud indicator data may include both a labeled known fraudulent number data point and a labeled verified entity number data point. Additionally, based on the labels of the known fraudulent number data point and the verified entity number data point (e.g., the first and second affiliation data points), a third affiliation data point indicative of an unknown affiliation with either fraudulent activity and/or the alleged entity may be labeled "true" or "false". For example, the unknown affiliation data point may be labeled "true" if the known fraudulent number data point is "false" and the verified entity number data point is "false" or "null". The unknown affiliation data point may be labeled "false" if either the labeled known fraudulent number data point or the labeled verified entity number data point are "true". These labeled first, second, and/or third affiliation data points may be used to classify the number associated with the incoming call 116 as a known fraudulent number, a verified number of the entity, or an unknown number.

Accordingly, certain embodiments may determine first fraud indicator data based on a number associated with an incoming call as part of voice phishing monitoring. The processes 500A and 500B described above is provided merely as an example, and may include additional, fewer, different, or differently arranged steps than depicted in FIG. 5A and FIG. 5B.

Figure 6:
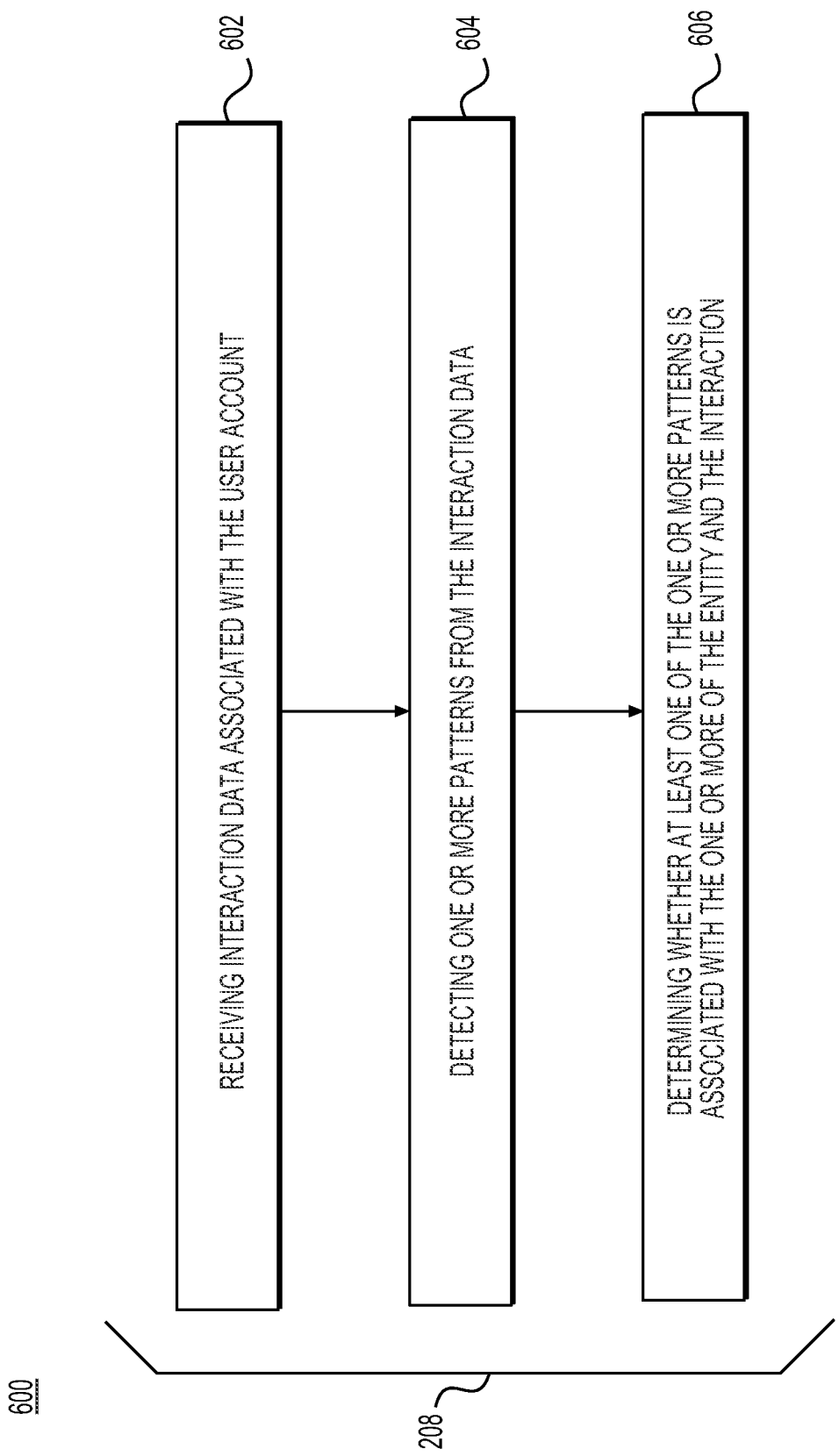
FIG. 6 depicts a flowchart of an exemplary process for determining second fraud indicator data, according to certain embodiments.

FIG. 6 depicts a flowchart of an exemplary process 600 for determining second fraud indicator data, according to certain embodiments. In some examples, the process 600 may be performed by the server device 104 (e.g., via the phishing monitoring system 120 operating thereon). The process 600 may be used to perform at least a portion of step 208 of process 200.

At step 602, the process 600 may include receiving interaction data associated with the user account. The interaction data may include past interactions made with various entities via the user account. As a non-limiting, illustrative example, the user account may be a financial account and the interaction data may be past financial transactions (e.g., payments made) with various entities via the user account. In some examples, the interaction data may be managed and stored by another system or device that is accessible by the server device 104. Therefore, the server device 104 may receive the interaction data from the other system or device. In some examples, the other system or device may be associated with a same provider associated with the server device 104 (e.g., the provider provides both phishing monitoring and user account services). In other examples, the other system or device may be associated with a different provider that has given the server device 104 associated with the provider of the voice phishing monitoring services permission to access.

At step 604, the process 600 may include detecting one or more patterns from the interaction data. The detected patterns may include patterns based on particular entities with whom interactions have been made via the user account, particular types of interactions made via the user account including the details thereof (e.g., frequency, associated amount if payment-related), and/or the particular types of interactions in conjunction with the particular entities with whom the interactions were made (e.g., interactions related to monthly payments for a given item made to company A).

At step 606, the process 600 may include determining whether at least one of the patterns is associated with the one or more of the entity and the interaction that are allegedly associated with the incoming call. The second fraud indicator data may be based on the determination made at step 606.

In some examples, the second fraud indicator data may include one or more labeled interaction data correspondence data points. For example, the second fraud indicator data may include a first interaction data correspondence data point that is labeled with "true" if there is a correspondence between the interaction data and the entity (e.g., there have been past interactions with the entity via the account), or "false" if there is no correspondence. The second fraud indicator data may also include a second interaction data correspondence data point that is labeled with "true" if there is a correspondence between the interaction data and the interaction (e.g., there have been past interactions of similar types and/or having similar details), or "false" if there is no correspondence. The second fraud indicator data may further include a third interaction data correspondence data point that is labeled with "true" if there is a joint correspondence between the interaction data, the interaction, and entity (e.g., there have been past interactions with the entity of similar types and/or having similar details), or "false" if there is no joint correspondence. Additionally, in instances where there is a joint correspondence, a further determination may be made as to whether the alleged interaction with the entity has already occurred via the user account based on the interaction data. If it is determined that the alleged interaction with the entity has already occurred via the user account, then the third interaction data correspondence data point may be re-labeled as "false".

In some examples, one or more of the first, second, and third interaction data correspondence data points may be weighted or scaled (e.g., for input into the model, described elsewhere herein). For example, the third interaction data correspondence data point may be weighted or scaled to contribute more than the first or second correspondence data points because a joint correspondence of the alleged entity and interaction to the interaction data is a better indicator that the call is likely not fraudulent than either a correspondence of the entity or interaction alone.

To provide an illustrative example, an entity alleged may be Company A and the interaction alleged may be an overdue January mortgage payment. Patterns detected in the interaction data may indicate previous interactions (e.g., payments) have been made to Company A via the user account, previous interactions have included mortgage payments, but those mortgage payments have been to a different entity than alleged (e.g., Company B). Therefore, the first and second interaction data correspondence data points may be labeled true, but the third interaction data correspondence data point may be labeled false. Therefore, the second fraud indicator data may indicate a higher likelihood that the call is fraudulent than if the interaction data patterns had shown that previous mortgage payments had been made to Company A (however, it is not necessarily fraudulent as the user may have recently switched to Company A to handle their mortgage).

In another illustrative example with similar facts, except that the previous interactions have included mortgage payments that were made to the same entity alleged (e.g., Company A), a further determination as to whether the January mortgage payment has already been paid to Company A via the user account may be made based on the interaction data. If the January mortgage payment had not been made, the first, second, and third interaction data correspondence data points may be labeled true indicating a less likelihood of fraud. On the other hand, if the January mortgage payment has already been made, the third interaction data correspondence data point may be re-labeled false despite the joint correspondence, which indicates a higher likelihood of fraud. For example, a fraudster may have obtained information that the user has a mortgage through Company A and leverage that information to attempt to get the user to divulge sensitive information like their user account information.

Accordingly, certain embodiments may determine second fraud indicator data based on user account interaction data as part of voice phishing monitoring. The process 600 described above is provided merely as an example, and may include additional, fewer, different, or differently arranged steps than depicted in FIG. 6.

Figure 7:
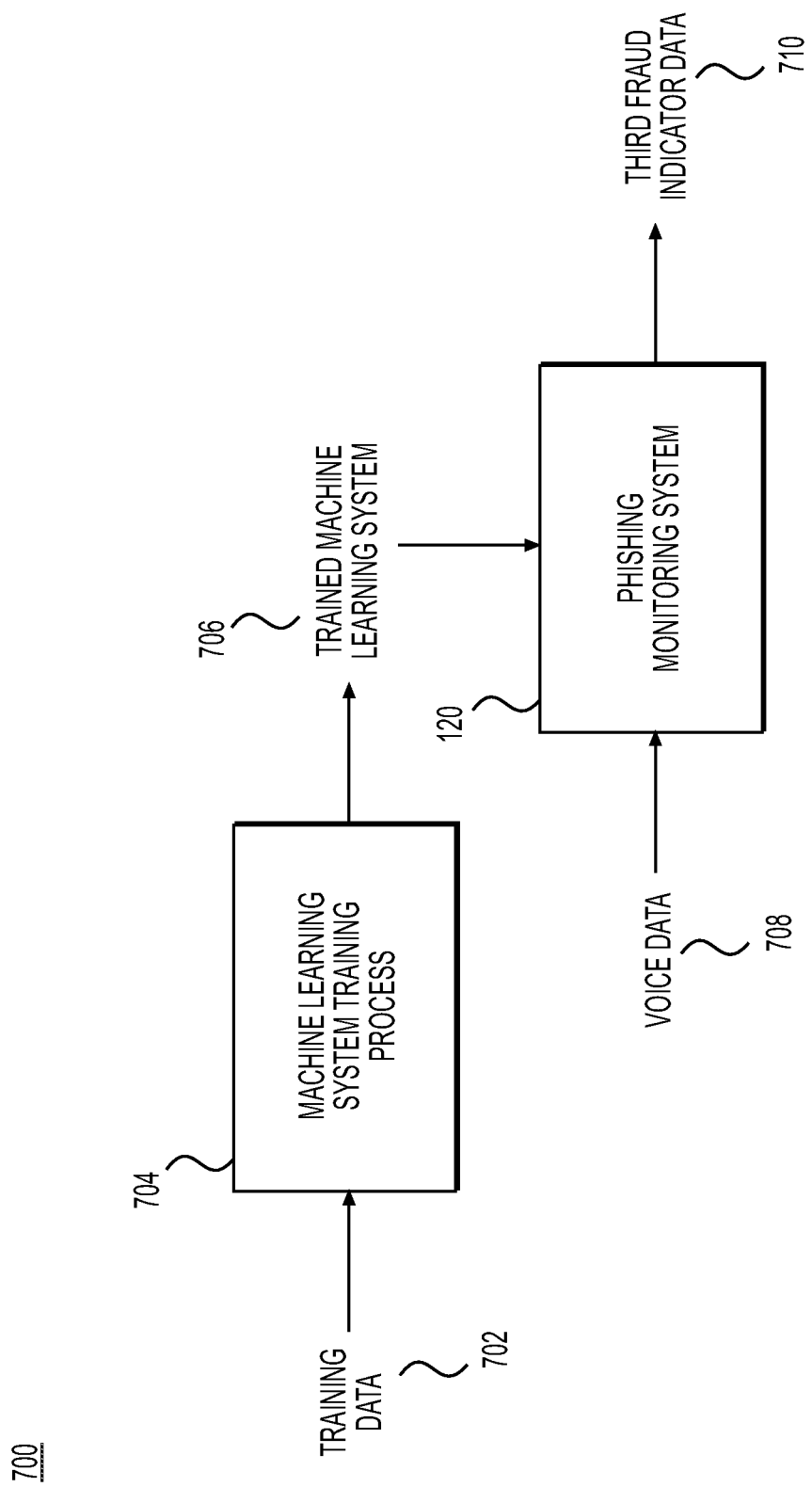
FIG. 7 depicts a block diagram of an exemplary process for training and using a machine learning system to determine third fraud indicator data, according to certain embodiments.

FIG. 7 depicts a block diagram of an exemplary process 700 for training and using a machine learning system to determine third fraud indicator data, according to certain embodiments. As depicted in FIG. 7, at step 704, the process 700 may include receiving and processing training data 702 to generate (e.g., build) a trained machine learning system 706 for predicting third fraud indicator data. In some examples, the server device 104 may perform step 704. In other examples, the server device 104 may receive the trained machine learning system 706 from a system or device other than the components shown in the exemplary environment 100 in FIG. 1 that generates the trained machine learning system 706. The training data 702 may include voice data of past incoming calls to a plurality of different communication devices that were collected and stored. The training data 702 may be generated, received, or otherwise obtained from internal and/or external resources. For example, the training data 702 may include voice data from past incoming calls that were monitored and stored by the provider of the server device 104. Additionally, or alternatively, the training data 702 may include voice data from past incoming calls that were monitored and stored by other providers or entities (e.g., training data 702 may be received from an external repository or data store).

The trained machine learning system 706 may include a trained model. Generally, a model includes a set of variables, e.g., nodes, neurons, filters, etc., that are tuned, e.g., weighted or biased, to different values via the application of the training data 702. In some examples, the training process at step 704 may employ supervised, unsupervised, semi-supervised, and/or reinforcement learning processes.

When supervised learning processes are employed, labels or scores corresponding to the voice data of the past incoming calls (e.g., labels or scores corresponding to the training data) may facilitate the learning process by providing a ground truth. For example, the labels or scores may indicate known third fraud indicator data associated with content and/or one or more voice characteristics identified from the voice data of the past incoming calls. Training may proceed by feeding voice data of a past incoming call from the training data into the model of the machine learning system, the model having variables set at initialized values, e.g., at random, based on Gaussian noise, a pre-trained model, or the like. The model may output predicted third fraud indicator data for the voice data of the past incoming call. The output may be compared with the corresponding label or score (e.g., the ground truth) to determine an error, which may then be back-propagated through the model to adjust the values of the variables. This process may be repeated for each past incoming call at least until a determined loss or error is below a predefined threshold. In some examples, some of the training data 702 may be withheld and used to further validate or test the trained machine learning system 706.

For unsupervised learning processes, the training data 702 may not include pre-assigned labels or scores to aid the learning process. Rather, unsupervised learning processes may include clustering, classification, or the like to identify naturally occurring patterns in the training data 702. K-means clustering or K-Nearest Neighbors may also be used, which may be supervised or unsupervised. Combinations of K-Nearest Neighbors and an unsupervised cluster technique may also be used. For semi-supervised learning, a combination of training data 702 with pre-assigned labels or scores and training data 702 without pre-assigned labels or scores may be used to train the model.

When reinforcement learning is employed, an agent (e.g., an algorithm) may be trained to make a decision regarding third fraudulent indicator data of the past incoming calls from the training data 702 (e.g., a likelihood of fraud based on content and/or voice characteristic(s)) through trial and error. For example, upon making a decision, the agent may then receive feedback (e.g., a positive reward if decided a likelihood of fraud and the past incoming call was fraudulent), adjust its next decision to maximize the reward, and repeat until a loss function is optimized.

Once trained, the trained machine learning system 706 may be stored and subsequently applied by the server devices (e.g., by the phishing monitoring system 120 operated by the server device 104). For example, the trained machine learning system 706 may be applied upon receiving voice data of an incoming call, such as incoming call 116 to predict third fraud indicator data 710. The third fraud indicator data 710 may be a likelihood of the incoming call 116 being fraudulent based on content and/or voice characteristic(s) identified from the voice data 708.

In some examples, the trained machine learning system 706 may be trained at step 704 to process both text data (e.g., converted from speech of voice data 708 using natural language processing or other similar techniques) to evaluate for fraud based on content and voice data 708 to evaluate for fraud based on voice characteristics. For example, when the trained machine learning system 706 is applied to voice data 708, the converted text data (e.g., representing content of the voice data) may be processed to identify words and/or phrases that correspond to known patterns used by fraudsters when engaging in voice phishing. Based on the processing of the text data, a first value indicating a likelihood of the incoming call being fraudulent based on the content of the voice data of the incoming call may be output as part of the third fraud indicator data 710. Additionally, or alternatively, the trained machine learning system 706 may process the voice data 708 to identify one or more voice characteristics that may be associated with (e.g., characteristics that are impacted or changed) during fraudulent utterances, such as tone (e.g., voice quality), pitch, tempo, intensity (e.g., loudness), and/or the like. For example, in comparison to non-fraudulent utterances, fraudulent utterance may have a lower tone, higher pitch, faster tempo, and higher intensity. Based on the processing of the voice data, a second value indicating a likelihood of the incoming call being fraudulent based on the identified voice characteristics may be output as part of the third fraud indicator data 710.

In some examples, a combined value (e.g., of first and second values) indicating a likelihood of the incoming call being fraudulent based on both the content of the voice data and the identified voice characteristics may be output as part of the third fraud indicator data 710. In further examples, the combined value may be a weighted aggregation of the first value and the second value. As a non-limiting example, the first value may be weighted or scaled to contribute more to the combined value given that the presence of certain words or phrases may be more reliable as a fraud indicator than voice characteristics. As described elsewhere herein, the third fraud indicator data 710 may include the first value, second value, and/or combined value as a data point. In other examples, the third fraud indicator data 710 may include one or more labeled voice content and characteristics data points of "true" or "false" based on the first value, second value, and/or combined value.

Although training and use of a single trained machine learning system 706 is described herein for outputting the third fraud indicator data, in other examples, two different machine learning systems may be similarly trained and implemented to output the third fraud indicator data. For example, a first machine learning system may be trained to process the text data to evaluate for fraud based on content and a second machine learning system may be trained to process the voice data to evaluate for fraud based on voice characteristics. In some examples, the third fraud indicator data is based on a weighted or unweighted aggregation of the values output by each of the first and second machine learning systems.

The example process 700 described above is provided merely as an example, and may include additional, fewer, different, or differently arranged aspects than depicted in FIG. 7.

Figure 8:
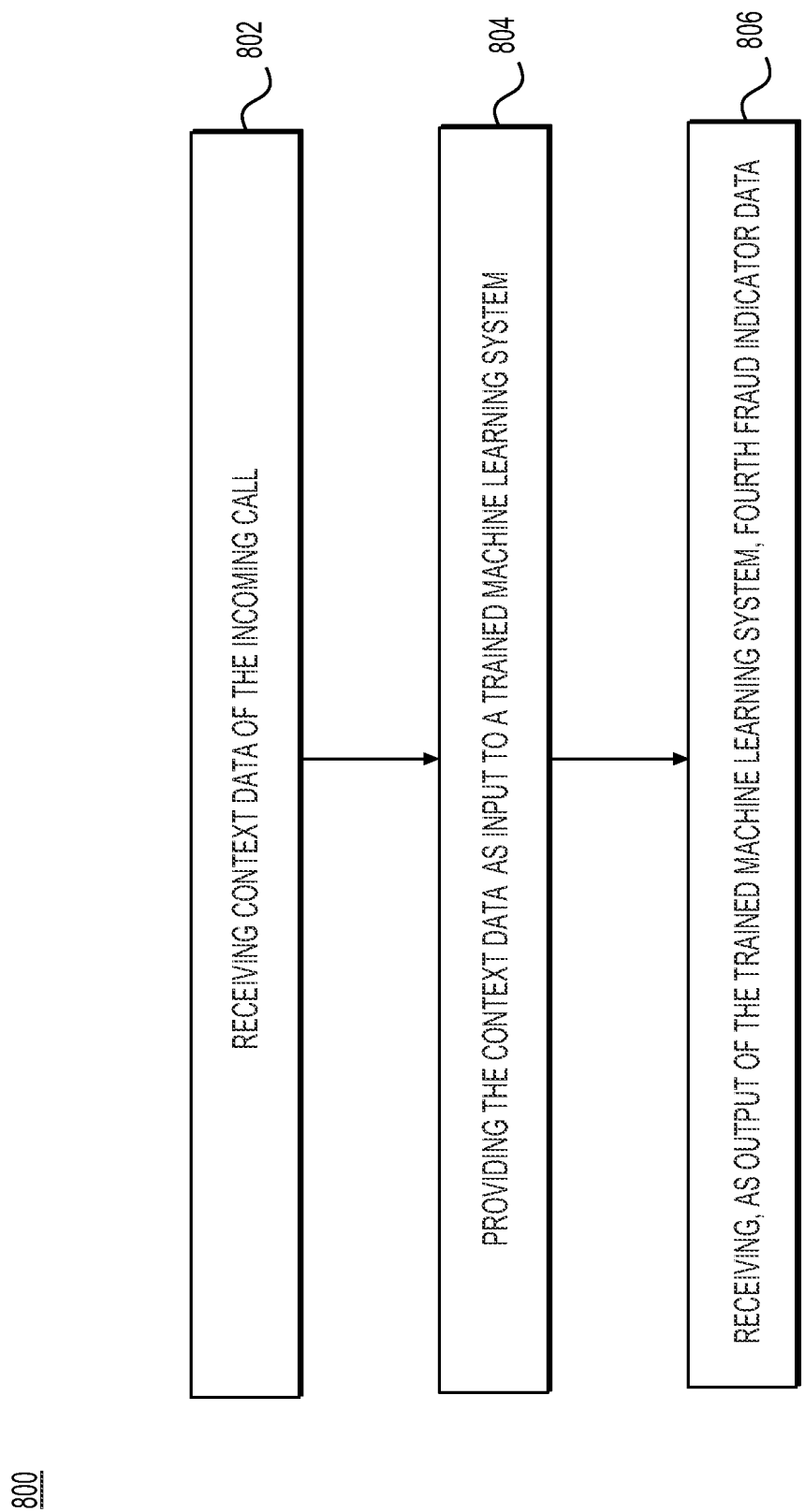
FIG. 8 depicts a flowchart of an exemplary process for determining fourth fraud indicator data using a trained machine learning system, according to certain embodiments.

FIG. 8 depicts a flowchart of an exemplary process 800 for determining fourth fraud indicator data using a trained machine learning system, according to certain embodiments. At step 802, the process 800 may include receiving context data of the incoming call 116. For example, the server device 104 may receive the context data from the application 113 and/or may extract the context data from the processed voice data (and/or from processed text data converted from the voice data). The context data may include a day of week the incoming call 116 is received, a time of day the incoming call 116 is received, a duration of the incoming call 116 prior to the caller identifying one or more of the entity or the interaction allegedly associated with the incoming call 116, or an origin of the number of the incoming call 116. Fraudsters often exhibit behavioral patterns, such as placing calls on certain days and/or times, to achieve the best success. Also, fraudsters often work off of scripts when placing calls from which patterns can be detected. One aspect of these patterns may include how long it takes before the caller announces themselves (e.g., the entity with which they are associated) or the reason why they are calling (e.g., the interaction). Therefore, this contextual data can be useful for identifying further indicators of fraud.

At step 804, the process 800 may include providing the context data to a trained machine learning system. The trained machine learning system may be the same trained machine learning system 706 used to determine the third fraud indicator data (e.g., a first trained machine learning system). For example, the first trained machine learning system may be further trained using context data-based training data. In other examples, the trained machine learning system may be a separate, second trained machine learning system from the first trained machine learning system used to determine the third indicator data. The second trained machine learning system may be trained in a similar manner as discussed above for the first trained machine learning system, except that the training data includes context data for past incoming calls. In some examples, when the second trained machine learning system is trained using supervised learning techniques, the training data may further include labels or scores for each of the past incoming calls that indicate a known status of the past incoming calls (e.g., fraudulent, confirmed, or unknown/undetermined).

At step 806, the process 800 may include receiving the fourth fraud indicator data as output from the trained machine learning system. The fourth fraud indicator data may include a value output from the trained machine learning system as a context-related data point. The value may represent a probability or percentage of fraud (e.g., 0.54 or 54% likelihood of fraud) based on the context data. In examples where the first trained machine learning system is trained to determine both third and fourth fraud indicator data, the values representing the probability or percentage of fraud based on content and/or voice characteristics and based on the context data may be aggregated or combined in a weighted or unweighted manner. Additionally, or alternatively, the fourth fraud indicator data may include a labeled context-related data point of "true" or "false" based on the value, where a label of "true" indicates fraud. For example, the value output from the trained machine learning system may be compared to a predefined threshold value, where if the value meets or exceeds the predefined threshold value, a "true" label is assigned.

Accordingly, certain embodiments may determine fourth fraud indicator data based on context data of an incoming call as part of voice phishing monitoring. The process 800 described above is provided merely as an example, and may include additional, fewer, different, or differently arranged steps than depicted in FIG. 8.

Figure 9:
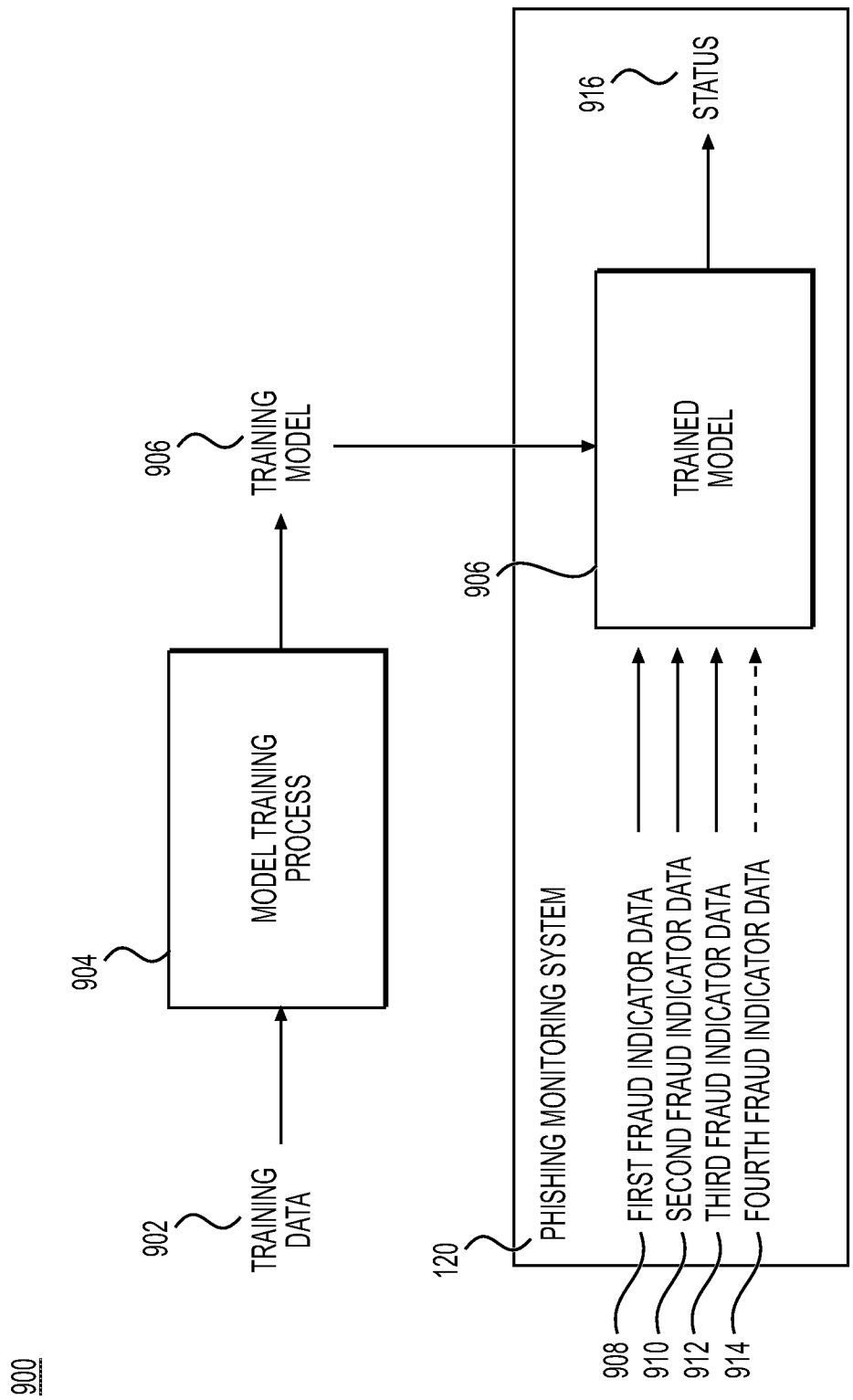
FIG. 9 depicts a block diagram of an exemplary process for training and using a model to determine a status of an incoming call based on one or more of a plurality of fraud indicator data types, according to certain embodiments.

FIG. 9 depicts a block diagram of an exemplary process 900 for training and using a model to determine a status of an incoming call (e.g., incoming call 116) based on one or more of a plurality of fraud indicator data types. Process 900 may be used to perform at least a portion of step 212 of process 200. As depicted in FIG. 9, at step 904, the process 900 may include receiving and processing training data 902 to generate (e.g., build) a trained model 906 for predicting a status of an incoming call, such as the incoming call 116. In some examples, the server device 104 may perform step 904. In other examples, the server device 104 may receive the trained model 906 from a system or device other than the components shown in the exemplary environment 100 in FIG. 1 that generate the trained model 906. The training data 902 may include one or more types of fraud indicator data for past incoming calls to a plurality of different communication devices that were collected and stored. For example, the training data 902 may include at least first, second, and/or third fraud indicator data associated with the past incoming calls. The training data 902 may also optionally include fourth fraud indicator data associated with the past incoming calls.

The training data 902 may be generated, received, or otherwise obtained from internal and/or external resources. For example, the training data 902 may include fraud indicator data from past incoming calls that were monitored and stored by the provider of the server device 104. Additionally, or alternatively, the training data 902 may include fraud indicator data from past incoming calls that were monitored and stored by other providers or entities (e.g., training data 902 may be received from an external repository or data store).

Generally, a model includes a set of variables, e.g., nodes, neurons, filters, etc., that are tuned, e.g., weighted or biased, to different values via the application of the training data 902. In some examples, the trained model 906 may be a trained statistical model. In other examples, the trained model 906 may be a trained machine learning model, and the training process at step 904 may employ supervised, unsupervised, semi-supervised and/or reinforcement learning processes.

When supervised learning processes are employed, labels or scores corresponding to a known status of the past incoming calls (e.g., fraudulent or confirmed) may facilitate the learning process by providing a ground truth. Training may proceed by feeding first, second, third and/or fourth fraud indicator data of a past incoming call from the training data 902 into the model, the model having variables set at initialized values, e.g., at random, based on Gaussian noise, a pre-trained model, or the like. The model may output a predicted status for the past incoming call. The output may be compared with the corresponding label or score (e.g., the ground truth) to determine an error, which may then be back-propagated through the model to adjust the values of the variables. This process may be repeated for each past incoming call at least until a determined loss or error is below a predefined threshold. In some examples, some of the training data 902 may be withheld and used to further validate or test the trained model 906.

For unsupervised learning processes, the training data 902 may not include pre-assigned labels or scores to aid the learning process. Rather, unsupervised learning processes may include clustering, classification, or the like to identify naturally occurring patterns in the training data 902. K-means clustering or K-Nearest Neighbors may also be used, which may be supervised or unsupervised. Combinations of K-Nearest Neighbors and an unsupervised cluster technique may also be used. For semi-supervised learning, a combination of training data 902 with pre-assigned labels or scores and training data 902 without pre-assigned labels or scores may be used to train the model.

When reinforcement learning is employed, an agent (e.g., an algorithm) may be trained to make a decision regarding the status of a past incoming call (e.g., fraudulent or confirmed) from the training data 902. The agent may then receive feedback (e.g., a positive reward if decided fraudulent and the past incoming call was fraudulent), adjust its next decision to maximize the reward, and repeat until a loss function is optimized.

Once trained, the trained model 906 may be stored and subsequently applied by the server device 104 (e.g., by phishing monitoring system 120 operated by the server device 104). For example, at least first fraud indicator data 908, second fraud indicator data 910, and/or third fraud indicator data 912 for an incoming call to a communication device, such as the incoming call 116 to the user device 102, may be determined by the server device 104 in other processes (e.g., via the phishing monitoring system 120), as described elsewhere herein. Fourth indicator data 914 may also be optionally determined. The trained model 906 may receive one or more of these fraud indicator data types (e.g., first, second, third and/or fourth fraud indicator data 908, 910, 912, 914) as input. The input may be processed by the trained model 906 to predict a status 916 for the incoming call. In some examples, fraud indicator data of differing types may have different associated weights applied when processed by the trained model 906. For example, types of fraud indicator data that contribute more to a likelihood of fraud may have a greater weight. As one example, a "false" known fraudulent number data point within first fraud indicator data may have a lower associated weight because fraudsters are constantly obtaining and/or using new numbers making this data point less contributory (e.g., less impactful) as an indicator of a confirmed status. In contrast, a "true" third interaction data correspondence data point indicative of a joint correspondence between the interaction data, the interaction, and entity may have a higher weight based on the independent verification provided by the user account interaction data.

In some examples, the status 916 output by the trained model 906 may be a classification of the incoming call as fraudulent, confirmed, or (optionally) unknown. In some examples, the trained model 906 may output a value indicating a likelihood of the incoming call 116 being fraudulent. The value may then be compared to a predefined threshold value. If the value meets or exceeds the predefined threshold value, then the status 916 may be determined or classified as fraudulent. If the value is below the predefined threshold value, then the status 916 may be determined as confirmed (e.g., non-fraudulent). Optionally, an intermediate status (e.g., an unknown or undetermined status) may be determined as an alternative to confirmed or fraudulent. In such examples, there may be a first predefined threshold value and a second predefined threshold value. If the value meets or exceeds the first predefined threshold value, then the status 916 may be determined as fraudulent. If the value is below the first predefined threshold value but above the second predefined threshold value, then the status 916 may be determined as an unknown or undetermined status. If the value is below the second predefined threshold value, then the status 916 may be determined as confirmed (e.g., non-fraudulent).

While the examples above involve training and using a model to determine a status of an incoming call (e.g., incoming call 116) based on one or more of a plurality of fraud indicator data types, it should be understood that the techniques for training and using the model disclosed herein may be adapted to other incoming communications, such as text messages, electronic messages, and/or the like. For example, the model may be trained and used to determine a status of an incoming communication (e.g., a text-based communication) based one or more of fraud indicator data associated with a content, style and/or format of the text data, in addition to other fraud indicator data such as an associated phone number or electronic email address, interaction data associated with the user account, and/or context data of the communication.

Figure 10:
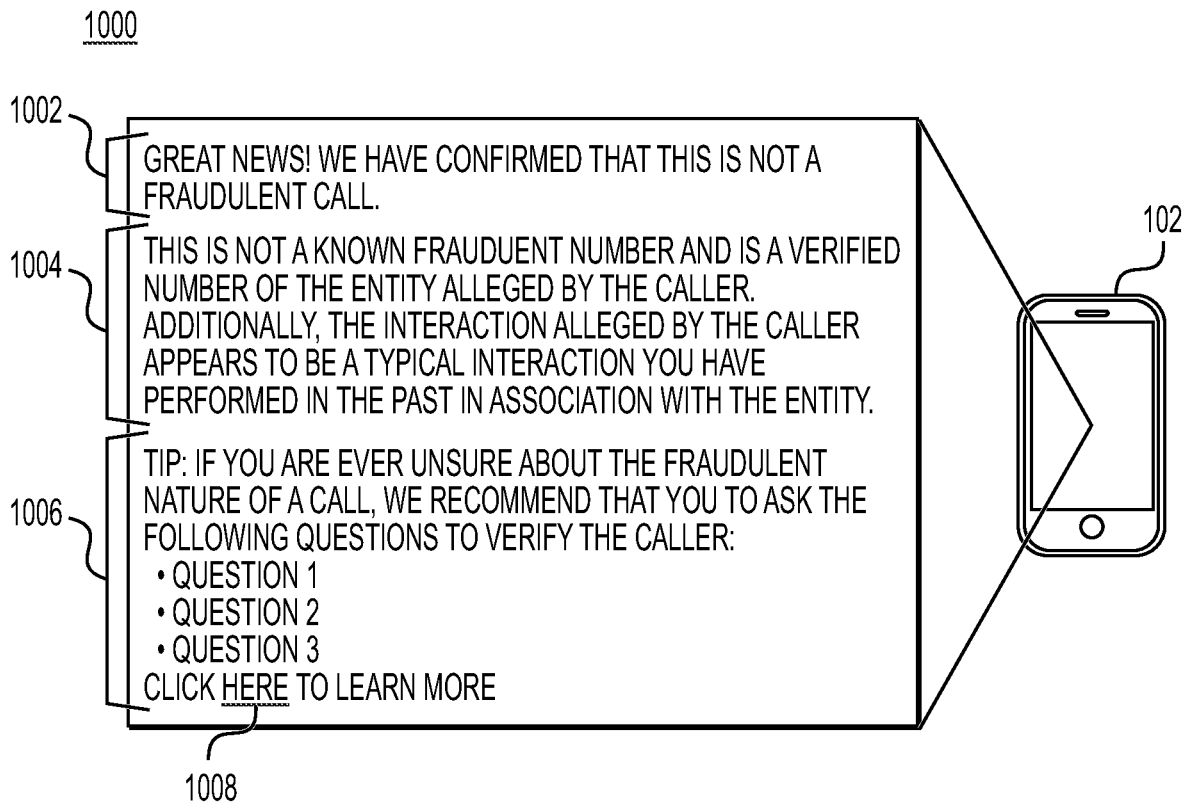
FIG. 10 depicts an exemplary notification displayed on a communication device when a status of the incoming call is confirmed, according to certain embodiments.

FIG. 10 depicts an exemplary notification 1000 displayed on a communication device (e.g., user device 102 receiving incoming call 116) when a status of the incoming call 116 is confirmed, according to certain embodiments. The notification 1000 may be received at the user device 102 from the server device 104 over the network 106 and displayed thereon. In some examples, the notification 1000 may be received as a push notification through the application 113 executing on the user device 102. In other examples, the notification 1000 may be provided as a text message to the user device 102. In further examples, the notification 1000 may be provided through electronic mail (e-mail) that is accessible on the user device 102 and/or another computing device of the user.

The notification 1000 may include a status indicator 1002 comprised of text, images, animated graphics and/or the like that indicates the status of the incoming call as confirmed (e.g., non-fraudulent). In some examples, the notification 1000 may optionally include supplemental information 1004 associated with one or more of the first, second, third, and/or fourth fraud indicator data contributing to the determination of the confirmed status. The supplemental information 1004 may increase the user's confidence in the determined status. In further examples, the notification may also optionally include educative information 1006 (e.g., in the form of tips for future incoming calls) to prevent the user from falling prey to voice phishing. For example, the educative information 1006 may give the user tools for proactively identifying fraudulent activity, such as questions that can be asked to verify the caller. Additionally, or alternatively, the notification may optionally include one or more control elements, such as link 1008, that upon selection may cause the application 113 to provide for display additional educative information.

The notification 1000 described above is provided merely as an example, and may include additional, fewer, different, or differently arranged information and/or interactive control elements than depicted in FIG. 10.

Figure 11:
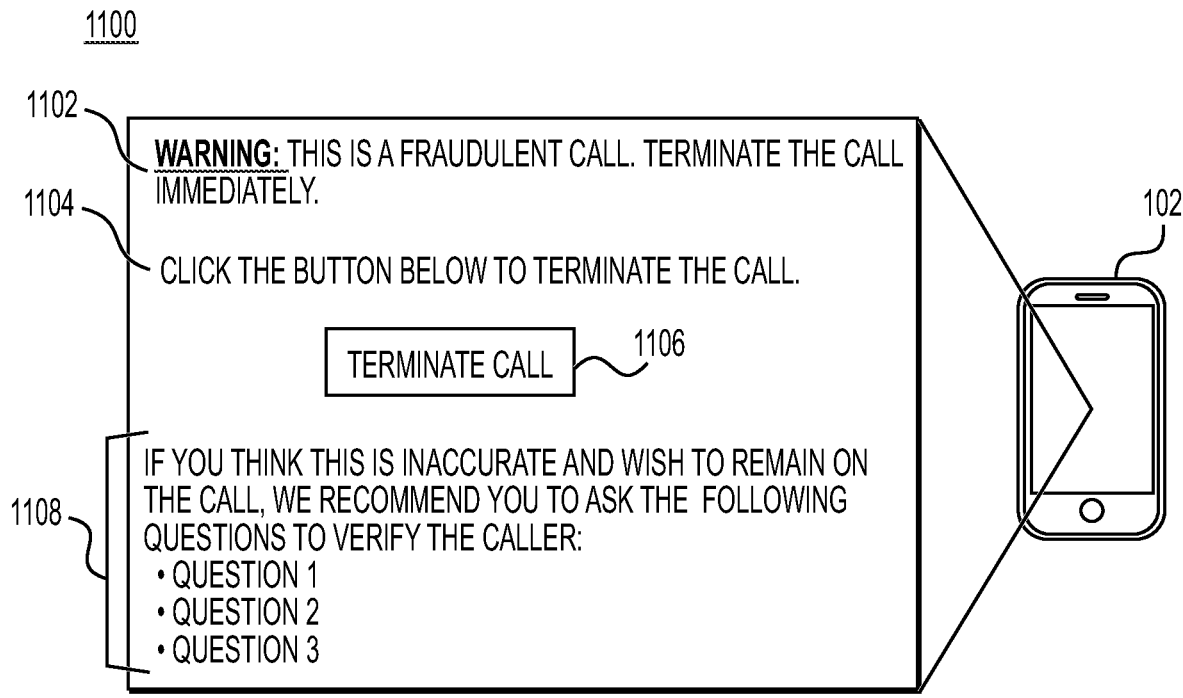
FIG. 11 depicts an exemplary notification displayed on a communication device when a status of the incoming call is fraudulent, according to certain embodiments.

FIG. 11 depicts an exemplary notification 1100 displayed on a communication device (e.g., user device 102 receiving incoming call 116) when a status of the incoming call 116 is fraudulent, according to certain embodiments. The notification 1100 may be received at the user device 102 from the server device 104 over the network 106 and displayed thereon. In some examples, the notification 1100 may be received as a push notification through the application 113 executing on the user device 102. In other examples, the notification 1100 may be provided as a text message to the user device 102. In further examples, the notification 1100 may be provided through electronic mail (e-mail) that is accessible on the user device 102 and/or another computing device of the user.

The notification 1100 may include a status indicator 1102 comprised of text, images, animated graphics and/or the like that indicates the status of the incoming call 116 as fraudulent. In some examples, the fraudulent status may be provided visually or graphically in a form of a warning (e.g., to catch the user's attention) and the warning may further suggest one or more recommended actions to take (e.g., terminate the call) in view of the fraudulent status. In some examples, the notification 1000 may optionally include a control element 1106 and associated information 1104 describing the control element that, upon selection, causes the application 113 to automatically terminate the incoming call 116 at the user device 102 on behalf of the user. In further examples, the notification 1100 may also optionally include a prompt 1108 for the user to verify one or more of the entity or the interaction during the incoming call 116 (e.g., in a scenario where the user does not want to terminate the call). The prompt 1108 may include questions to verify the caller and the interaction they are allegedly calling about.

The notification 1100 described above is provided merely as an example, and may include additional, fewer, different, or differently arranged information and/or interactive control elements than depicted in FIG. 11.

While many of the example methods and systems described above involve determining a fraudulent or confirmed status of an incoming call to monitor for and protect users against voice phishing, it should be understood that techniques according to this disclosure may be adapted to other incoming communications, such as text messages, electronic messages, and/or the like to monitor for and protect users against other common types of phishing (e.g., smishing and email phishing).

For example, in other embodiments, the phishing monitoring system 120 may provide a smishing monitoring service for incoming text messages to the user device 102 in addition, or alternatively, to the voice phishing monitoring service for incoming calls to the user device 102. In an exemplary smishing monitoring process performed by the phishing monitoring system 120, data associated with an incoming text message to a communication device (e.g., user device 102) may be received via the application 113. In some examples, the data may be limited to a number associated with the text message. In such examples, at least first fraud indicator data may be determined based on a number associated with the text message. For example, a first data set comprising a plurality of known fraudulent numbers may be queried using the number to determine whether the number is a known fraudulent number. If the number is a known fraudulent number, the status is determined as fraudulent and a notification indicating the fraudulent status may be generated and provided to the communication device for display.

In other examples, a user of the communication device may opt in (e.g., through settings of the application 113) to allow the phishing monitoring system 120 to access and/or read all types of data associated with the text message, including the content of the text message. In these other examples, first fraud indicator data, second fraud indicator data, third fraud indicator data, and/or fourth fraud indicator data may be determined and used to determine a status of the text message as fraudulent or confirmed. For example, an entity and an interaction allegedly associated with the incoming text message may be identified from the text message data (e.g., from the content). First fraud indicator data may be determined based on an affiliation of the number associated with the text message to a known fraudulent number as discussed above and/or an affiliation of the number to the entity allegedly associated with the incoming text message (e.g., by querying a second data set comprising one or more verified numbers for each of a plurality of entities). Similar to step 208 in process 200 and/or process 600 described above, second fraud indicator data may be determined based on a correspondence of the account interaction data to the alleged entity and/or the interaction. Additionally, the text message data may be provided as input to a trained machine learning system to receive, as output, third fraud indicator based on one or more of a content, style and/or format of the text message data. Optionally, context data of the incoming text message (e.g., a time and/or day of the week the text message was received, a duration of the text message, including duration prior to identifying the entity and/or interaction, and/or an origin of the number, etc.) may also be provided to a same or different trained machine learning system to obtain, as output, fourth fraud indicator data. A status for the incoming text message may then be determined as at least fraudulent or confirmed based on one or more of the first, second, third, and/or fourth indicator data using a model similar to the trained model 906 described elsewhere herein. A notification indicating the status (e.g., similar to at least one of notifications 1000, 1100) may be generated and provided for display on the communication device.

In general, any process or operation discussed in this disclosure that is understood to be computer-implementable, such as the processes or operations depicted in FIGS. 2-11, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

FIG. 12 depicts an example of a computer 1200, according to certain embodiments. FIG. 12 is a simplified functional block diagram of a computer 1200 that may be configured as a device for executing processes or operations depicted in, or described with respect to, FIGS. 2-11, according to exemplary embodiments of the present disclosure. For example, the computer 1200 may be configured as the user device 102, the server device 104, and/or another device according to exemplary embodiments of this disclosure. In various embodiments, any of the systems herein may be a computer 1200 including, e.g., a data communication interface 1220 for packet data communication. The computer 1200 may communicate with one or more other computers 1200 using the electronic network 1225. The network interfaces 114A, B in FIG. 1 may include one or more communication interfaces 1220. The electronic network 1225 may include a wired or wireless network similar to the network 106 depicted in FIG. 1.

The computer 1200 also may include a central processing unit ("CPU"), in the form of one or more processors 1202, for executing program instructions 1224. The program instructions 1224 may include instructions for running the application 113 (e.g., if the computer 1200 is user device 102). The program instructions 1224 may include instructions for running the phishing monitoring system 120 (e.g., if the computer 1200 is server device 104). The processors 110A, B depicted in FIG. 1 may include one or more processors 1202. The computer 1200 may include an internal communication bus 1208, and a drive unit 1206 (such as read-only memory (ROM), hard disk drive (HDD), solid-state disk drive (SDD), etc.) that may store data on a computer readable medium 1222, although the computer 1200 may receive programming and data via network communications. The computer 1200 may also have a memory 1204 (such as random access memory (RAM)) storing instructions 1224 for executing techniques presented herein, although the instructions 1224 may be stored temporarily or permanently within other modules of computer 1200 (e.g., processor 1202 and/or computer readable medium 1222). The memories 112A, B depicted in FIG. 1 may include one or more memories 1204. The computer 1200 also may include user input and output ports 1212 and/or a display 1210 to connect with input and output devices such as keyboards, mice, touchscreens, monitors, displays, etc. The displays 108A, B may include one or more displays 1210. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning system or models for voice phishing monitoring to determine a status of an incoming call, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for voice phishing monitoring, comprising:
    receiving, from an application associated with an account of a user that is executing on a communication device associated with the user, voice data of an incoming call to the communication device placed by a potential fraudster device, the voice data representing a conversation between the user and a potential fraudster associated with the potential fraudster device;
    identifying, from the voice data, an entity and an interaction allegedly associated with the incoming call;
    determining first fraud indicator data based on a number associated with the incoming call;
    determining second fraud indicator data based on a correspondence of interaction data associated with the account to one or more of the entity and the interaction;
    providing the voice data as input to a trained machine learning system to receive, as output of the trained machine learning system, third fraud indicator data based on a content of the conversation and one or more voice characteristics of the potential fraudster identified from the voice data, wherein the one or more voice characteristics identified from the voice data include at least one of a tone, a pitch, a tempo, or an intensity of utterances of the potential fraudster during the conversation;
    determining a status for the incoming call based on the first, the second, and the third fraud indicator data, wherein the status is at least one of fraudulent or confirmed; and
    generating a notification that indicates the status for display on the communication device.

2. The computer-implemented method of claim 1, wherein an option to accept the incoming call through the application is provided for display on a user interface of the communication device, and the voice data of the incoming call is received in response to a selection of the option on the user interface.

3. The computer-implemented method of claim 2, wherein the option to accept the incoming call through the application is provided in response to a determination that the number associated with the incoming call is not included within a contacts list associated with the communication device.

4. The computer-implemented method of claim 1, wherein, when the status is fraudulent, generating the notification further comprises:
    generating a notification that further includes a control element that, upon selection, causes the application to terminate the incoming call.

5. The computer-implemented method of claim 1, wherein generating the notification further comprises:
    including information within the notification to prompt a user to verify one or more of the entity or the interaction during the incoming call.

6. The computer-implemented method of claim 1, further comprising:
    at least one of:
        providing the notification as a push notification through the application for display on the communication device; or
        providing the notification as a text message to the communication device.

7. The computer-implemented method of claim 1, wherein the first fraud indicator data classifies the number associated with the incoming call as a known fraudulent number, a verified number of the entity, or an unknown number.

8. The computer-implemented method of claim 7, wherein determining the first fraud indicator data comprises at least one of:
 querying, using the number associated with the incoming call, a first data set comprising a plurality of known fraudulent numbers; or
 querying, using the number associated with the incoming call and the entity, a second data set comprising one or more verified numbers for each of a plurality of entities including the entity.

9. The computer-implemented method of claim 1, wherein determining the second fraud indicator data comprises:
 detecting one or more patterns from the interaction data associated with the account; and
 determining whether at least one of the one or more patterns is associated with the one or more of the entity and the interaction.

10. The computer-implemented method of claim 1, wherein determining the status for the incoming call comprises:
 providing the first, the second, and the third fraud indicator data as input to a model;
 receiving, as output of the model, a value indicating a likelihood that the incoming call is fraudulent; and
 comparing the value to a predefined threshold value to determine the status.

11. The computer-implemented method of claim 1, wherein the trained machine learning system is a first trained machine learning system, and the method further comprising:
 providing context data of the incoming call as input to one of the first trained machine learning system or a second trained machine learning system to obtain, as output, fourth fraud indicator data; and
 determining the status of the incoming call further based on the fourth fraud indicator data.

12. The computer-implemented method of claim 11, wherein the context data includes one or more of a day of week the incoming call is received, a time of day the incoming call is received, a duration of the incoming call prior to identifying one or more of the entity or the interaction, or an origin of the number of the incoming call.

13. A system for voice phishing monitoring, comprising:
 at least one memory storing instructions; and
 at least one processor operatively connected to the at least one memory and configured to execute the instructions to perform operations, including:
  receiving, from an application associated with an account of a user that is executing on a communication device associated with the user, voice data of an incoming call to the communication device placed by a potential fraudster device, the voice data representing a conversation between the user and a potential fraudster associated with the potential fraudster device;
  identifying, from the voice data, an entity and an interaction allegedly associated with the incoming call;
  determining first fraud indicator data based on a number associated with the incoming call;
  determining second fraud indicator data based on a correspondence of interaction data associated with the account to one or more of the entity and the interaction;
  providing the voice data as input to a trained machine learning system to receive, as output of the trained machine learning system, third fraud indicator data based on a content of the conversation and one or more voice characteristics of the potential fraudster identified from the voice data, wherein the one or more voice characteristics identified from the voice data include at least one of a tone, a pitch, a tempo, or an intensity of utterances of the potential fraudster during the conversation;
  determining a status for the incoming call based on the first, the second, and the third fraud indicator data, wherein the status is at least one of fraudulent or confirmed; and
  generating a notification that indicates the status for display on the communication device.

14. The system of claim 13, wherein an option to accept the incoming call through the application is provided for display on a user interface of the communication device in response to a determination that the number associated with the incoming call is not included within a contacts list associated with the communication device, and the voice data of the incoming call is received in response to a selection of the option on the user interface.

15. The system of claim 13, wherein, when the status is fraudulent, generating the notification further comprises:
 generating a notification that further includes a control element that, upon selection, causes the application to terminate the incoming call.

16. The system of claim 13, wherein the first fraud indicator data classifies the number associated with the incoming call as a known fraudulent number, a verified number of the entity, or an unknown number, and determining the first fraud indicator data comprises at least one of:
 querying, using the number associated with the incoming call, a first data set comprising a plurality of known fraudulent numbers; or
 querying, using the number associated with the incoming call and the entity, a second data set comprising one or more verified numbers for each of a plurality of entities, including the entity.

17. The system of claim 13, wherein determining the second fraud indicator data comprises:
 detecting one or more patterns from the interaction data associated with the account; and
 determining whether at least one of the one or more patterns is associated with the one or more of the entity and the interaction.

18. The system of claim 13, wherein determining the status for the incoming call comprises:
 providing the first, the second, and the third fraud indicator data as input to a model;
 receiving, as output of the model, a value indicating a likelihood that the incoming call is fraudulent; and
 comparing the value to a predefined threshold value to determine the status.

19. The system of claim 13, wherein the trained machine learning system is a first trained machine learning system, and the operations further comprising:
 providing context data of the incoming call as input to one of the first trained machine learning system or a second trained machine learning system to obtain, as output, fourth fraud indicator data, wherein the context data includes one or more of a day of week the incoming call is received, a time of day the incoming call is received, a duration of the incoming call prior to identifying one or more of the entity or the interaction, or an origin of the number of the incoming call; and determining the status of the incoming call further based on the fourth fraud indicator data.

20. A computer-implemented method for voice phishing monitoring, comprising:

receiving, from an application associated with an account of a user that is executing on a communication device associated with the user, voice data of an incoming call to the communication device placed by a potential fraudster device, wherein an option to accept the incoming call through the application is provided for display on a user interface of the communication device in response to a determination that a number associated with the incoming call is not included within a contacts list associated with the communication device, and the voice data of the incoming call is received in response to a selection of the option on the user interface, the voice data representing a conversation between the user and a potential fraudster associated with the potential fraudster device;

identifying, from the voice data, an entity and an interaction allegedly associated with the incoming call;

determining first fraud indicator data based on a number associated with the incoming call;

determining second fraud indicator data based on a correspondence of interaction data associated with the account to one or more of the entity and the interaction;

providing the voice data as input to a trained machine learning system to receive, as output of the trained machine learning system, third fraud indicator data based on a content of the conversation and one or more voice characteristics of the potential fraudster identified from the voice data, wherein the one or more voice characteristics identified from the voice data include at least one of a tone, a pitch, a tempo, or an intensity of utterances of the potential fraudster during the conversation;

determining a status for the incoming call based on the first, the second, and the fraud indicator data, wherein the status is at least one of fraudulent or confirmed; and generating a notification that indicates the status for display on the communication device.

* * * * *